(12) United States Patent
White et al.

(10) Patent No.: US 8,107,457 B2
(45) Date of Patent: *Jan. 31, 2012

(54) MULTI-ACCESS TERMINAL WITH CAPABILITY FOR SIMULTANEOUS CONNECTIVITY TO MULTIPLE COMMUNICATION CHANNELS

(75) Inventors: Patrick E. White, Bernardsville, NJ (US); Nicolas Girard, Hackensack, NJ (US)

(73) Assignee: The Trustees of Stevens Institute of Technology, Hoboken, NJ (US)

( * ) Notice: Subject to any disclaimer, the term of this patent is extended or adjusted under 35 U.S.C. 154(b) by 88 days.

This patent is subject to a terminal disclaimer.

(21) Appl. No.: 12/399,338

(22) Filed: Mar. 6, 2009

(65) Prior Publication Data

US 2009/0168701 A1 Jul. 2, 2009

Related U.S. Application Data

(63) Continuation of application No. 11/283,610, filed on Nov. 18, 2005, now Pat. No. 7,539,175.

(60) Provisional application No. 60/629,472, filed on Nov. 19, 2004.

(51) Int. Cl.
*H04J 3/06* (2006.01)

(52) U.S. Cl. ........ 370/350; 370/236; 370/396; 370/474; 370/469; 370/467; 370/351; 370/252; 370/238; 370/328; 370/372; 370/310; 370/331; 455/456.2; 455/435.2; 455/442; 455/443; 709/230; 709/228; 709/220

(58) Field of Classification Search .................. 709/230, 709/228, 220; 370/236, 396, 474, 350, 469, 370/467, 351, 252, 238, 328, 465, 437, 310, 370/352, 329, 331, 400; 455/456.2, 435.2, 455/442, 443

See application file for complete search history.

(56) References Cited

U.S. PATENT DOCUMENTS

| | | |
|---|---|---|
| 5,878,035 A | 3/1999 | Wang et al. |
| 6,052,600 A | 4/2000 | Fette et al. |
| 6,272,120 B1 | 8/2001 | Alexander |
| 6,278,697 B1 | 8/2001 | Brody et al. |
| 6,418,324 B1 | 7/2002 | Doviak et al. |
| 6,526,264 B2 | 2/2003 | Sugar et al. |
| 6,693,899 B1 | 2/2004 | Makridakis |
| 6,697,345 B1 | 2/2004 | Corrigan, III et al. |
| 6,714,544 B1 | 3/2004 | Bosloy et al. |

(Continued)

OTHER PUBLICATIONS

International Search Report and Written Opinion dated Sep. 21, 2006, issued in related International Patent Application No. PCT/US05/41838.

(Continued)

*Primary Examiner* — Kwasi Karikari

(74) *Attorney, Agent, or Firm* — Greenberg Traurig, LLP

(57) ABSTRACT

An apparatus is disclosed for permitting a mobile terminal having multiple, heterogeneous network connections (e.g., multiple wired or wireless transceivers of various types) to set up and maintain virtual connections over multiple networks to either the same or to multiple destinations. The mobile terminal can "load-share" traffic, i.e., it can distribute segments of traffic over a full set of heterogeneous networks, significantly improving the reliability and availability of communications. In a first embodiment, a mobile terminal is configured with multiple radio frequency (RF) transceivers. Operating system software is provided for dynamically establishing and maintaining traffic flow for user applications over multiple communications paths, and for automatically adapting to variations in the networking environment, application traffic flow requirements, end user preferences, or mobility. In a second embodiment, a software-defined radio is used to implement the physical layer protocols for each desired network, eliminating the need for multiple transceivers.

14 Claims, 13 Drawing Sheets

U.S. PATENT DOCUMENTS

| | | | |
|---|---|---|---|
| 6,862,271 | B2 | 3/2005 | Medvedev et al. |
| 6,950,657 | B1* | 9/2005 | Hiller et al. ............... 455/445 |
| 7,539,175 | B2* | 5/2009 | White et al. ............... 370/350 |
| 2001/0050922 | A1 | 12/2001 | Tiernay et al. |
| 2002/0048351 | A1 | 4/2002 | Donovan et al. |
| 2002/0075831 | A1 | 6/2002 | Lozano |
| 2002/0131418 | A1 | 9/2002 | Raftelis et al. |
| 2003/0064726 | A1 | 4/2003 | Bae |
| 2003/0227883 | A1 | 12/2003 | Rimoni et al. |
| 2004/0008723 | A1 | 1/2004 | Uchida et al. |
| 2004/0028009 | A1* | 2/2004 | Dorenbosch et al. ...... 370/329 |
| 2004/0208145 | A1 | 10/2004 | Sim et al. |
| 2004/0214539 | A1 | 10/2004 | Rajamani et al. |
| 2004/0219918 | A1 | 11/2004 | Kakishima et al. |
| 2004/0246939 | A1* | 12/2004 | Koskiahde et al. ......... 370/351 |
| 2004/0252696 | A1 | 12/2004 | Kakishima et al. |
| 2005/0073977 | A1 | 4/2005 | Vanghi et al. |
| 2005/0078616 | A1 | 4/2005 | Nevo et al. |
| 2005/0091307 | A1* | 4/2005 | Venkatsubra et al. ...... 709/203 |
| 2006/0142013 | A1* | 6/2006 | Sayers et al. ............... 455/445 |

OTHER PUBLICATIONS

RFC 4168, "The Stream Control Transmission Protocol (SCTP) as a Transport for the Session Initiation Protocol (SIP)", Oct. 2005, on Internet web site http://www.ietf.org/rfc/rfc4168.txt.

RFC 2960, "Stream Control Transport Protocol", Oct. 2000, on internet web site http://www.faqs.org/rfcs/rfc2960.html.

RFC 2401, "Security Architecture for the Internet Protocol", Nov. 1996, on Internet web site http://www.ietf.org/rfc/rfc2401.txt?number=2401.

"Stream Control Transport Protocol (SCTP) Dynamic Address Reconfiguration", Draft Standard, Jun. 10, 2004, on Internet web site http://www.ietf.org/internet-drafts/draft-ietf/tsvwg-addip-sctp-09.txt.

"Robust Header Compression (rohc)", Feb. 15, 2006, on Internet site http://www.ietf.org/html.charters/rohc-charter.html.

E. Kohler, et al., "The Click Modular Router", ACM Transactions an Computer Systems. vol. 15, No. 3, Aug. 2000, pp. 263-297.

J. Noonan, et al., "A Study of SCTP Services in a Mobile-IP Network", Proc. Information Technology & Telecommunications Conference, Ireland, Oct. 2002.

G. Youngblood. "A Software-Defined Radio for the Masses, Part 1". QEX, Jul./Aug. 2002, pp. 13-21, Austin, Texas.

L. Ma, et al., "A New Method to Support UMTS/WLAN Vertical Handover Using SCTP", IEEE Wireless Communications, vol. 11, No. 4, pp. 45-51, Aug. 2004.

N. Girard, "On Building A Heterogeneous Wireless Access Networks Testbed", Stevens Institute of Technology, Hoboken, NJ, Jul. 15, 2004.

J. Forbess, et al., "A Handheld Software Radio Based on the IPAQ PDA: Hardware", 2003 Software Defined Radio Technical Conference, Orlando, Nov. 2003.

J. Chapin, et al., "Software Radio Technology and Challenges", Proceedings of the Thirty-Eighth Annual International Telemetering Conference, San Diego, Oct. 21-24, 2002.

G.S. Toumpis, "Performance, Optimization, and Cross-Layer Design of Media Access Protocols for Wireless Ad Hoc Networks", In Proceedings of IEEE Conference on Communications (ICC), May 2003.

\* cited by examiner

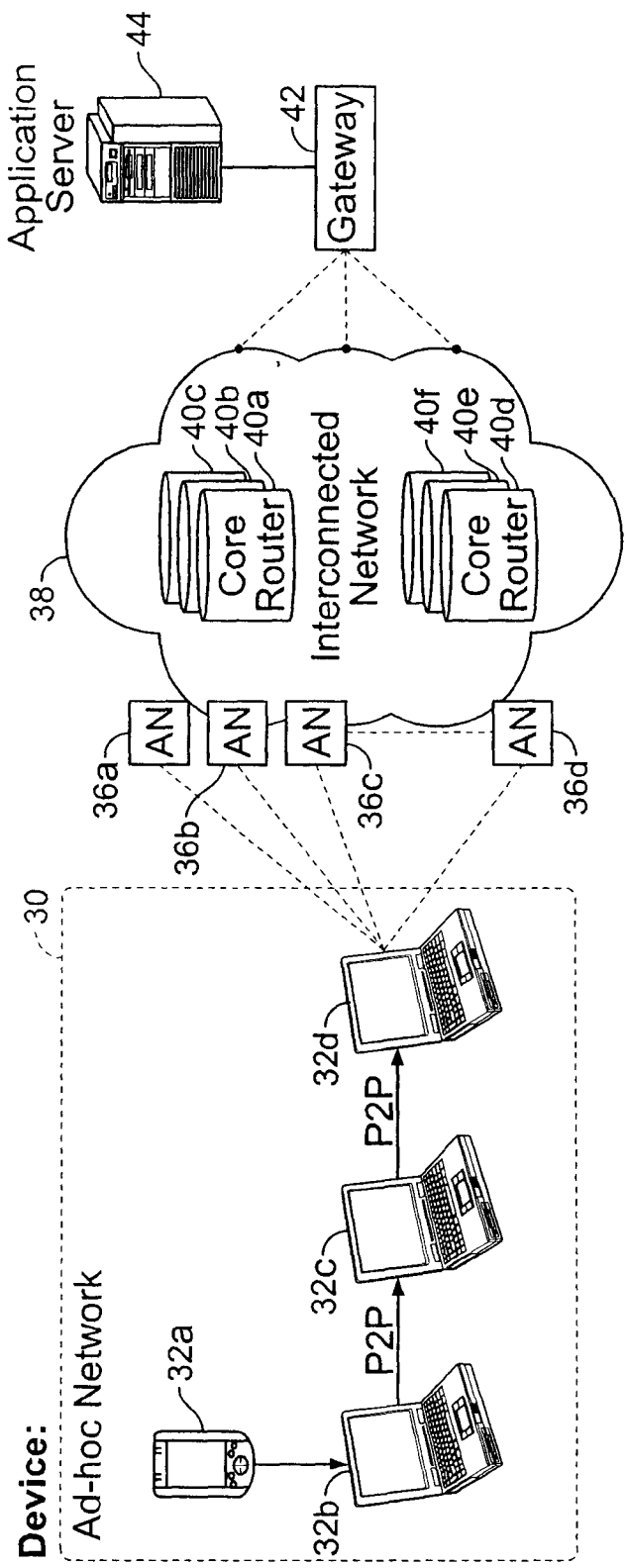
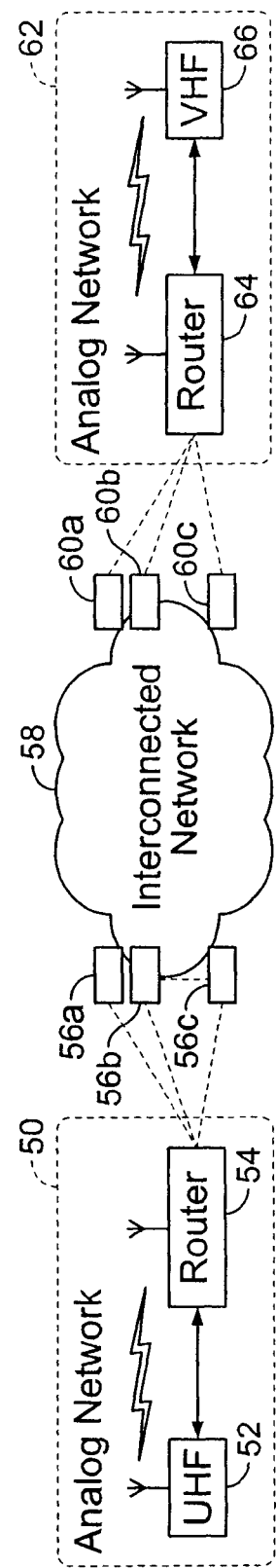
FIG. 1B
FIG. 1C

MULTI-ACCESS TERMINAL WITH CAPABILITY FOR SIMULTANEOUS CONNECTIVITY TO MULTIPLE COMMUNICATION CHANNELS

CROSS-REFERENCE TO RELATED APPLICATIONS

This application is a continuation of U.S. patent application Ser. No. 11/283,610 filed Nov. 18, 2005 now U.S. Pat. No. 7,539,175 and claiming the benefit of U.S. Provisional Patent Application Ser. No. 60/629,472 filed Nov. 19, 2004, the disclosure of which is incorporated herein by reference in its entirety.

FIELD OF THE INVENTION

The present invention relates to wireless communications, and more particularly, to a multi-access terminal for communicating over multiple, heterogeneous (e.g., wired and wireless) communication channels. The present invention provides a single, logical, improved, and tiered service by overlaying existing heterogeneous networks.

BACKGROUND OF THE INVENTION

In recent years, a wide proliferation of wireless systems and the use of software defined radio technologies have lead to the employment of heterogeneous networks, allowing service providers to use networks that are most efficient for a particular type of service. An example is the Internet, which is now a common, core network that interconnects various wireless access points. However, in the wireless realm, users of wireless networks are limited to the bandwidth and range of the protocol used, whether the protocol is IEEE 802.11, Code Division Multiple Access (CDMA) 1xRTT (CDMA2000), CDMA 1xEV-DO, Wideband Code Division Multiple Access (W-CDMA), Enhanced Data rates for GSM (Global System for Mobile Communications), Evolution (EDGE), General Packet Radio Service (GPRS), Universal Mobile Telecommunications System (UMTS), Worldwide Interoperability for Microwave Access (802.16, WiMAX), High-Speed Downlink Packet Access (HSDPA), satellite, Cellular Digital Packet Data (CDPD), Integrated Digital Enhanced Network (iDEN), or the like. In addition to bandwidth (downlink and uplink) and range limitations, a given wireless channel can also be subject to considerable interference and coverage limitations.

A major challenge presently facing the wireless industry is to efficiently utilize scarce wireless resources. On the one hand, limitations in available resources like spectrum, bandwidth, latency, and energy are becoming major bottlenecks. On the other hand, the proliferation of wide-band applications, such as real-time applications that send and receive high-quality audio and video, requires increased bandwidth and better Quality-of-Service (QoS). Today's wireless and wired networks are designed for specific service and applications, but wireless networks, while supporting mobility, usually don't satisfy the type of service supported by wired networks. Further, applications designed for wired networks have bandwidth requirements well beyond the capabilities of commercially available technologies, within the boundaries of applicable FCC regulations. A major overhaul of the present infrastructure to support such requirements would therefore be very costly and would still result in limitations.

Due to the limitations of present wireless infrastructure, it would be very advantageous in numerous sectors (e.g., commercial, government, civilian) to provide a system for allowing communication over multiple, heterogeneous wireless channels, as well as wired channels. For example, first responders, such as municipal law enforcement agencies and fire departments, have a need for improving the size of the area of coverage for their wireless communications requirements. Presently, bandwidth limitations, unreliability, lack of mobility support, and poor performance in general of wireless access networks prevent first responders from using wideband applications that would allow them to perform their jobs more efficiently. The current practice for first responder agencies is to build new communications towers to reduce or eliminate poor coverage areas within their respective jurisdictions. Depending on the area (e.g., a rural area), this approach could require the installation of numerous towers, which is an inherently expensive and time-consuming operation. While tower construction may improve coverage, such an approach does not provide broadband data capability since current first responder standards for wireless communication are primarily oriented towards voice services. Because of this drawback, first responder agencies are also considering WiFi (IEEE 802.11) hot spots across their jurisdictions by installing additional towers. However, this is an expensive proposition, and officers would have to drive to such sites for high-speed data services, resulting thereby in a potential inconvenience and a source of inefficiency.

Other agencies are considering upgrading or deploying commercial cellular data services, such as 1xRTT, 1xEV-DO (offered by CDMA operators) or EDGE/GPRS (offered by GSM operators), which offer better bandwidth and allow for dedicated data channels. However while this would improve the quality of the communications medium (in terms of coverage, reliability, and bandwidth), such upgrades would still be unable to meet the requirements for mission-critical operations. In addition, the bandwidth offered by each operator is not sufficient to convey critical information, such as demanding video feeds and real-time traffic including two-way audio or video. In the commercial sector, VoWLAN (Voice over Wireless Local Area Networks) is being deployed in large cities to provide a cheap and high-bandwidth communication channel. The fundamental problems with these services are cost and limited access. In order to exploit VoWLAN services, new "dual-mode" devices need to be deployed. Also, these mobile units are restricted to the coverage of the WLAN used for operation. As the user moves out of the area covered by the wireless networks, calls are typically dropped, until they can be re-established on another wireless network. This is not suitable for fast-moving operations, such the ones conducted by public safety agencies. Further, for wireless applications, the need for QoS mechanisms is greater due to scarce resources, unpredictable available bandwidth, and variable error rates.

Accordingly, what would be desirable, but has not yet been provided, is a multi-access access terminal for communicating over multiple, heterogeneous (e.g., wired and wireless) communication channels, wherein a mobile client can simultaneously aggregate multiple connections to heterogeneous access points and/or ad-hoc network terminals to increase capacity and/or efficiency. An improvement in the collective QoS of the aggregated channels is a direct result, due to the heterogeneous environment and the characteristics of the channels.

SUMMARY OF THE INVENTION

The present invention overcomes the disadvantages and shortcomings of the prior art discussed above by providing a multi-access terminal that automatically and dynamically establishes and maintains simultaneous connections over multiple heterogeneous networks, creating aggregated communications pipes to one or more destinations. In a first embodiment, the multi-access terminal of the present invention includes a plurality of network transceivers for allowing communications across multiple, heterogeneous communications paths. The terminal includes a processor having a memory and at least one user application executing on the processor, wherein the user application requests communications with a computing system remote from the multi-access terminal. The present invention dynamically selects a combination of optimum network transceivers from the plurality of network transceivers, and establishes a network connection between a mobile terminal and a corresponding node using all selected network transceivers simultaneously. Via efficient stream and path management, the multi-access terminal of the present invention has the capability to determine the characteristics and requirements of application-level traffic flows and to optimize the network status so as to provide an ideal networking environment at any time to support its operations.

The multi-access terminal includes the capability to load-share traffic across multiple communication paths, duplicate traffic for enhanced reliability, and manage handovers as the terminal roams between networks, while operating transparently to users and applications. Applications supporting rate control and content-adaptation can use network status information generated by the invention to further optimize the behavior and performance of such applications. The multi-access terminal uses the proliferation of wireless access networks and necessary hardware to aggregate connections to networks offering different types of services.

In another embodiment, the present invention includes a software-defined radio that replaces the plurality of transceivers and allows a single-antenna system to be used to connect to multiple, heterogeneous communications networks. The terminal includes the same capabilities as the terminal of the first embodiment.

Further features and advantages of the invention will appear more clearly on a reading of the following detailed description of two exemplary embodiments of the invention.

BRIEF DESCRIPTION OF THE DRAWINGS

For a more complete understanding of the present invention, reference is made to the following detailed description of two exemplary embodiments considered in conjunction with the accompanying drawings, in which:

FIG. 1B is a diagram showing the multi-access terminal of the present invention implemented in a personal device, such a portable computer or a Personal Device Assistant (PDA), forming part of an ad-hoc network or a Personal Area Network (PAN);

FIG. 1C is a diagram showing the multi-access terminal of the present invention implemented in two routers communicating over a heterogeneous network, wherein two analog radios can exchange information using the two routers as relays;

FIG. 7A-7E are flowcharts showing the processing logic implemented by the multi-access terminal of the present invention, wherein FIG. 7A shows processing logic for mapping new application flows, FIG. 7B shows processing logic for constructing an application profile, FIG. 7C shows processing logic for mobility control space operations, FIG. 7D shows operations performed by each module of the mobility control space of the present invention, and FIG. 7E shows processing logic implemented for managing profiles and policies and mobility triggers.

DETAILED DESCRIPTION OF THE INVENTION

Figure 1A:
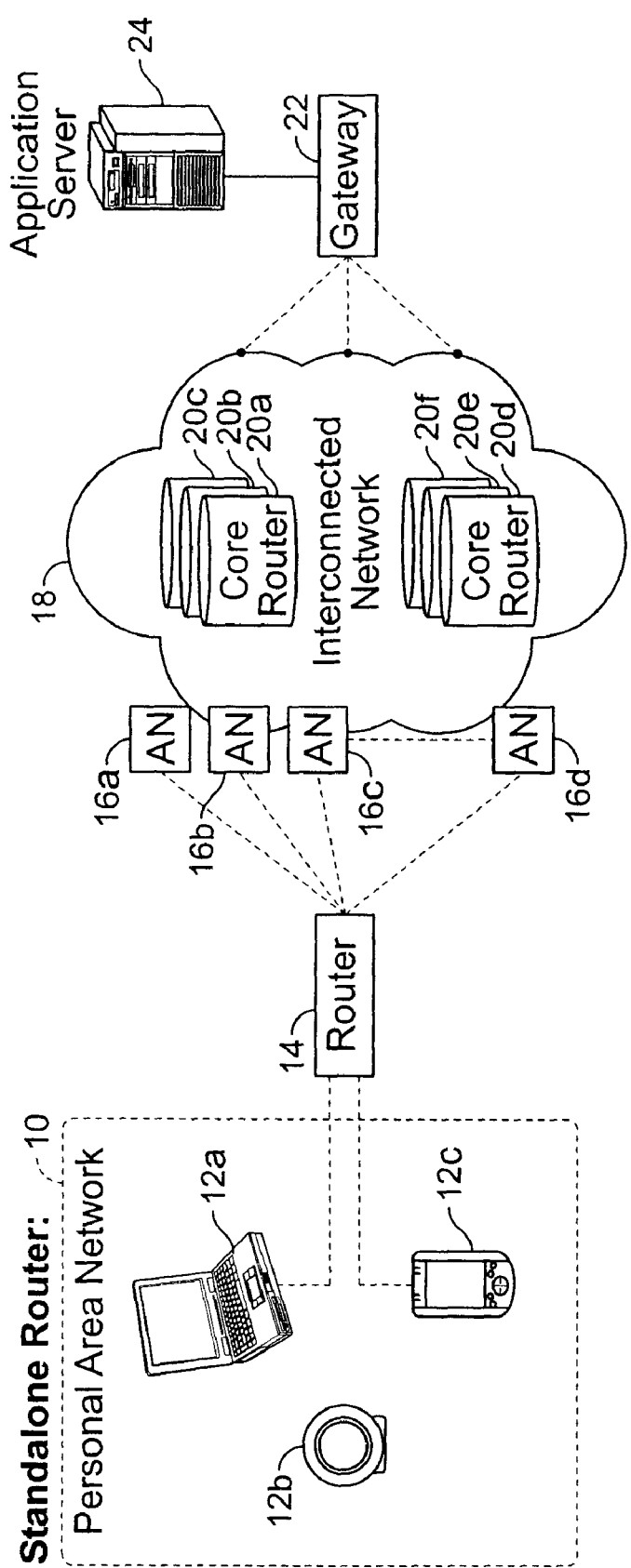
FIG. 1A is a diagram showing the multi-access terminal of the present invention implemented as a standalone router.

Described in overview form, the present invention relates to a communications system that provides service to wireless communications units (such units being referred to as "multi-access" terminals), and more specifically, to users operating such units. More particularly, the present invention allows for simultaneous communications over a range of various different (heterogeneous) access networks, in a manner that provides optimal characteristics for the specific requirements and time criticalities of applications and services. The present invention represents a shift from a pure, end-to-end communications (infrastructure-centric) model, as in today's telephone network, to a client-centric, application-aware network model (similar to the Internet), so as to allow the client to dynamically adapt and react to network conditions, user mobility, and context. Unlike the infrastructure-centric model, where users simply use the network as a communication medium to the extent of its capability, in the present invention, the client can control every aspect of the communication.

The present invention allows for the exploitation of the heterogeneity of access networks to define which combination of networks should be optimized for a particular service, while still supporting mobility. In other words, the present invention allows a mobile device to choose a combination of networks dynamically, based on the current network state and the characteristics of the services required. Depending on the type of service, the multi-access terminal of the present invention can automatically combine networks to increase the available capacity, to reduce the overall latency, or to favor uplink traffic while slowing down downlink traffic. A major advantage of the present invention is that the different access networks do not need to converge, thereby obviating the need for standardization and business commitment to support the present invention. A roaming agreement may exist between different wireless providers (e.g., between a cellular service provider and a IEEE 802.11 hotspot), but the present invention could also be implemented without roaming agreements. The multi-access terminal of the present invention only requires a service agreement with multiple providers of multiple access networks.

Based on a policy and accurate and agile network sensing, the multi-access terminal determines the ideal network state for the requested service. The invention uses a different transport layer, an augmented version of the Stream Control Transport Protocol (SCTP), to support simultaneous communication across a variety of networks while focusing on service latency and efficiency. The present invention differs from other proposed solutions (e.g., Mobile IP) in that it uses all available access networks simultaneously, as opposed to the traditional approach of using only a single network from a plurality of networks. Other proposed solutions merely hand active connections over from one network to another, but this could require several seconds and is not suitable for handling mobile users with real-time or time-critical needs.

The present invention is flexible and accommodates various different wireless access technologies. The characteristics of the access technologies are abstracted to user applications, making usage of these technologies transparent to the systems, network operators, and users. The architecture provides mobility management for seamless hand-over, energy efficient operations, multiple mechanisms to select the most effective configuration, and QoS mechanisms compatible with existing standards. Additionally, the present invention supports legacy equipment and applications using TCP/UDP data packets. Any combination of wired and wireless networks or access points may advantageously use the inventive principles and concepts described herein. For example, numerous access points implementing current (and future) standards and technologies, such as HyperLan, Bluetooth, WiMAX, Zeebeedee, Ultra-Wide Band (UWB), and other local area network technologies, as well as different forms of cellular and cellular-like access technologies, can be used and the concepts disclosed herein can be applied.

With reference to FIG. 1A, the multi-access terminal of the present invention could be implemented on one or more mobile devices 12a-12c having user applications executing thereon, each of which communicates with a router 14. The mobile devices 12a-12c form a personal area network 10. The router 14 includes multiple, heterogeneous communications interfaces which allow for communication across a heterogeneous network 18 via access nodes (or points) 16a-16d. The communications interfaces could be wireless, wired, or a combination thereof. For example, the interfaces could include a plurality of radio frequency (RF) cards capable of communicating using one or more unique wired or wireless communications protocols, such as IEEE 802.11, EDGE, GPRS, CDMA/1XRTT, CDMA/EV-DO, UMTS, 1XRTT, W-CDMA, GSM, UMTS, WiMAX, HSDPA, satellite, CDPD, iDEN, or the like.

The access nodes 16a-16d of the heterogeneous network 18 could include a plurality of wired or wireless access nodes or base stations, each of which could operate using any desired hardware and communications protocols. Thus, for example, the access node 16a could be an IEEE 802.11g wireless communications access node, whereas the access node 16b could be a CDMA access point (e.g., cell tower), with which one or more standard mobile devices (e.g., a cell phone) can communicate. In a UMTS or GPRS system, the access node 16c could be a GGSN (Gateway GPRS Support Node). In a CDMA system, the access node 16d can be a PDG (Packet Data Gateway). Examples of wired access nodes could include DSL or cable modem, router, switches and the like.

Due to the plurality of wireless network interfaces provided in the multi-access terminal of the present invention, the terminal can communicate with multiple access points using a modified version of the Stream Control Transport Protocol (SCTP), to be discussed herein in greater detail with reference to FIGS. 5a-6 and 7a, over wireless and wired channels. Thus, as can be readily appreciated, the multi-access terminal of the present invention provides compatibility with a multitude of heterogeneous communications hardware and protocols, while providing increased bandwidth and communications capabilities for applications running on the terminal. It should be noted that the multi-access terminal of the present invention (e.g., one or more of the devices 12a-12c of FIG. 1A) could also include one or more wired (e.g., wired Ethernet) connections to allow for a wired connection between the multi-access terminal and the Internet using any suitable bridge, gateway, or router.

As will be readily appreciated, the architecture of the network 18 could vary as desired. As shown in FIG. 1A for purposes of illustration, the network 18 could include the Internet, to which the access nodes 16a-16d are connected via one or more core routers 20a-20f. Optionally, software for encapsulating SCTP traffic into TCP/IP traffic (described below in greater detail) could be provided in the core routers 20a-20f, the access nodes 16a-16d, or both, to allow communication over the Internet using TCP/IP. A standard receiving server 24 (e.g., a server not having a plurality of communications interfaces, but rather, a single interface), such as an applications or database server, could be interconnected with the Internet via a gateway 22, and could optionally include multi-homing capabilities. The server 24 could include SCTP and TCP/IP stacks to allow for communications using the SCTP and/or TCP/IP protocols.

Any desired number of multi-access terminals according to the present invention, also having SCTP and TCP/IP stacks, can communicate with the Internet using a plurality of communications interfaces (IEEE 802.11, 1XRTT, CDMA, GSM, etc.) that allow for communication with access nodes 16a-16d. The access nodes 16a-16d could also include software for encapsulating SCTP traffic into TCP/IP traffic for transmission over the Internet using TCP/IP. Other mobile devices, such as GSM cell phones, can communicate with one or more of the access points 16a-16d, which could include a GSM cell phone tower. Applications executing on the multi-access terminals and are thus provided with multiple, heterogeneous communications channels that allow for the exchange of high-speed, high-bandwidth data. The access nodes 16a-16d could also include conventional, unmodified access points known in the art. Additionally, the access nodes 16a-16d could include embedded computers having the software of the present invention, which will be discussed hereinafter in greater detail.

As shown in FIG. 1B, the multi-access terminal of the present invention could be implemented in an ad-hoc network 30, which could include a plurality of mobile devices (e.g., PDAs, laptops, etc.) 32a-23d that can communicate with each other using peer-to-peer (P2P) communications. Each of the devices 32a-32d participating in the ad-hoc network 30 could use multiple transceivers to communicate with each other. The ad-hoc network 30 could be a personal network, or interconnected to one or more infrastructure-based networks or wired networks. The software of the present invention, installed on one or more of the devices 32a-32d, can detect and sense the capabilities of neighboring networks, and can automatically set up an ad-hoc network to support user and application requirements. Each of the devices 32a-32d could include multiple wireless interfaces for communicating with a plurality of access nodes 36a-36d interconnected with network 38. As shown in FIG. 1B, the device 32d can establish multiple communications paths with the plurality of access nodes 36a-36d, and such communications paths could be shared across the ad-hoc network 30 so that each of the devices 32a-32c can also communicate using multiple communications paths. The network 38 could include the Internet, and could include a plurality of core routers 40a-40f. A standard server 44 (such as an applications or database server) can communicate with the network 38 via a gateway 42.

It should be noted that the access nodes 16a-16d of FIGS. 1A and 36a-36d of FIG. 1B need not be compliant with the SCTP transport protocol, since the association and routing functions of the present invention are performed, respectively, at Layers 2 and 3 of the Open Systems Interconnect (OSI) layer model. In rare cases where the routing protocols are at a core router, such as the core routers 20a-20f of FIGS. 1A and 40a-40f of FIG. 1B, or in instances where security protocols at edge nodes of the Internet use transport layer information, the present invention includes encapsulation techniques (discussed below) for encapsulating SCTP packets into standard TCP packets. End-to-end communications thus are enabled using the SCTP packets or SCTP-in-TCP packets. If an existing native application (e.g., an application running on a device operating the software of the present invention) which does not support SCTP is employed, the present invention provides a standalone SCTP-to-TCP proxy module (as will be discussed below with reference to FIG. 6) to allow SCTP communications through encapsulation of the same into TCP packets.

With reference to FIG. 1C, regular analog equipment, such as analog networks 50 and 62 which could include UHF and VHF radios 52 and 66, respectively, could be bridged utilizing the multi-access terminal of the present invention. In this case, the multi-access terminal would be implemented as routers 54, 64 having multiple, heterogeneous (wired or wireless) network interfaces for communicating across an interconnected network 58 via access nodes 56a-56c and 60a-60c, respectively. The routers 54, 64 can detect analog signals from the radios 52, 66, and convert such signals into routable packets for transmission over the network 58 using multiple communications paths. A receiving node can transform the routable packets into an analog signal capable of being utilized by radios in the vicinity of the receiving node. It should be noted that the analog signal does not have to be converted back to the original analog signal (in terms of frequencies or modulation schemes), thus allowing interoperability.

Figure 2:
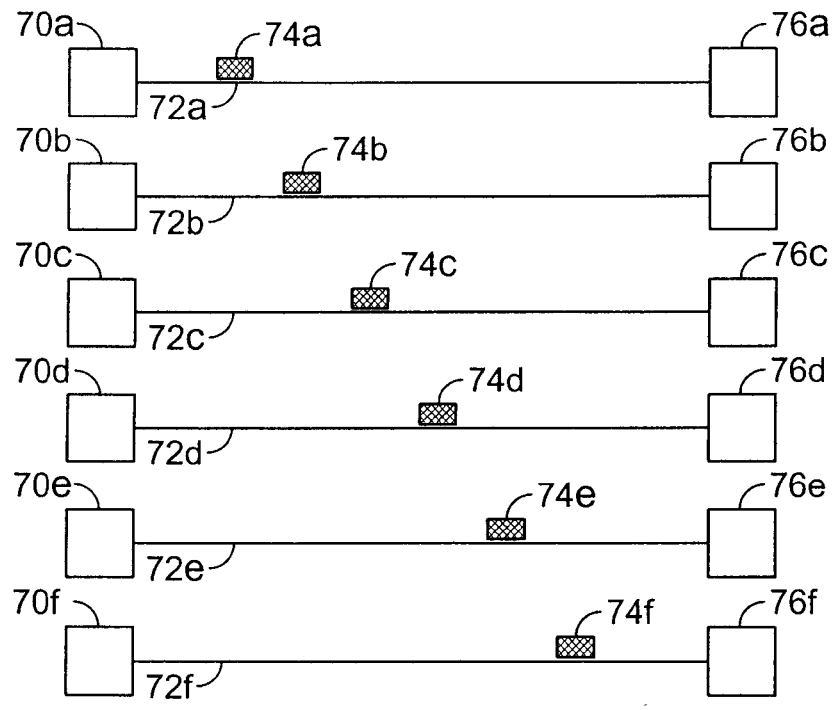
FIG. 2 is a diagram showing communication achieved by the present invention over multiple communication channels.

With reference to FIGS. 1A-1C and 2, the multi-access terminal of the present invention employs software that establishes multiple SCTP associations, such that a plurality of data packets are transferred to or from multiple communications interfaces of the multi-access terminal to multiple destination transceivers (which could include intelligent controllers embedded in the access points and any other desired access points) using a modified SCTP protocol. The software gives the multi-access terminal the capability to set up and maintain multiple, simultaneous connections over multiple networks to either the same destination or multiple destinations. Traffic can be distributed across the full set of active network connections, such that the traffic packets belonging to the same application can be "load-shared" across the set of active paths. Thus, as shown in FIG. 2, multiple connection paths 72a-72f established between a first set of communications transceivers 70a-70f (e.g., at a first multi-access terminal according to the present invention) and a second set of communications transceivers 76a-76f (e.g., at a second multi-access terminal according to the present invention) could be utilized to load-share application data packets 74a-74f.

Another application of the transmission architecture shown in FIG. 2 is for the multi-access terminal to use the same software and the SCTP protocol to reroute from one set of active connection paths (with a minimum of one active connection) to another set of active connection paths. This procedure is explained in detail below with reference to FIG. 5B. This hand-off situation occurs when a new network connection has better characteristics than an existing network connection. For example, an existing network connection can become momentarily unavailable (e.g., due to fading or a lack of coverage) or a new available network connection may have better characteristics in the current environment. This results in reduction of the likelihood of traffic loss and interruption of service, and contributes to the QoS provisioning for the current application flows. Still another application of the transmission architecture shown in FIG. 2 is that the multiple packets 74a-74f can be transmitted simultaneously to the same destination over the multiple network connection paths 72a-72f, thereby summing the capacity over the multiple network connection paths 72a-72f so as to provide broadband capacity, beyond the capability of any individual network connection. In this manner, the traffic load can be shared across a number of network connections.

With reference to FIGS. 1A-1C, the multi-access terminal of the present invention can initiate communication pipes with static corresponding nodes (routers, gateways, or application server with static IP addresses), which can be an Internet gateway, for instance. In order to support peer-to-peer or ad-hoc (see FIG. 1B) services with another multi-access terminal of the present invention, or any mobile terminal supporting dynamic IP addressing, the present invention must be used along with location management schemes such as Session Initiation Protocol (SIP) or Dynamic Domain Name Service (DDNS). Real-time applications will preferably use SIP to set up real-time session over the SCTP protocol. The use of SIP over SCTP has been published as a proposed standard (RFC 4168), which is available on the Internet at http://www.ietf.org/rfc/rfc4168.txt and the entire disclosure of which is expressly incorporated herein by reference.

Figure 3:
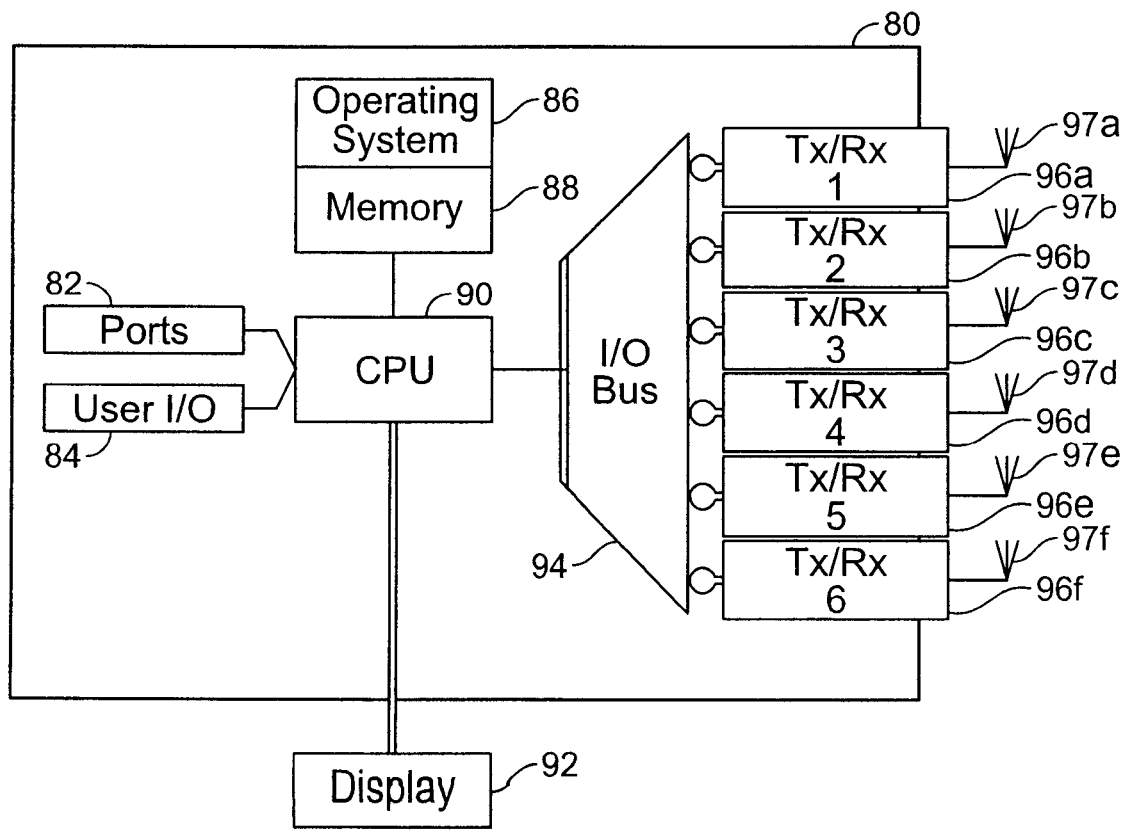
FIG. 3 is a block diagram showing the hardware architecture of the multi-access terminal of the present invention.

The multi-access terminal of the present invention could be constructed in accordance with the block diagram depicted in FIG. 3. The terminal (indicated generally at 80) could include a plurality of network interface transceivers 96a-96f electrically connected to a plurality of antennas 97a-97f, respectively. The network transceivers 96a-96f are capable of transmitting and receiving data and/or voice over a plurality of hardware types and associated transmission formats, such as IEEE 802.11 (WiFi), GSM, CDMA, TDMA, 1XRTT, etc. The multi-access terminal 80 could also include circuitry and electronics for communicating with pagers and legacy two-way radios, such Land Mobile Radio (LMR) and satellites (including Global Positioning System (GPS)). The antennas 97a-97f and the network transceivers 96a-96f can be provided on separate radio frequency (RF) cards, or on a single, multiple-format RF card. The multi-access terminal 80 is also capable of communicating over a wired line, such as Ethernet. An input/output (I/O) bus 94 allows a processor (or Central Processing Unit (CPU)) 90 in the terminal 80 to communicate using one or more of the network transceivers 96a-96f (and/or a wired line), for transmitting and/or receiving data packets over one or more of the antennas 97a-97f (and/or over a wired line). The I/O bus 94 could be any standard personal computer (PC) bus present known in the art, or a suitable multiplexer/demultiplexer. An internal data bus conveys data packets between the processor 90 and the I/O bus 94. The processor 90 is interconnected with a memory 88 via a data bus. Part of the memory 88 contains an operating system 86, which contains the software of the present invention (as will be discussed below in greater detail with respect to FIG. 4) executed by the processor 90 to perform a number of functions, including network monitoring functionality, application profiling, communications routing, voice encoding and compression, and other functionality. The memory 88 can be a combination of random access memory and/or a machine-readable medium, such as flash memory. A display 92 could be provided for monitoring activity of the processor 90 or for allowing interaction therewith using a keyboard or other suitable input device. Ports 82, 84 could also be provided for allowing user input/output and/or external data exchange with the processor 90.

Figure 4:
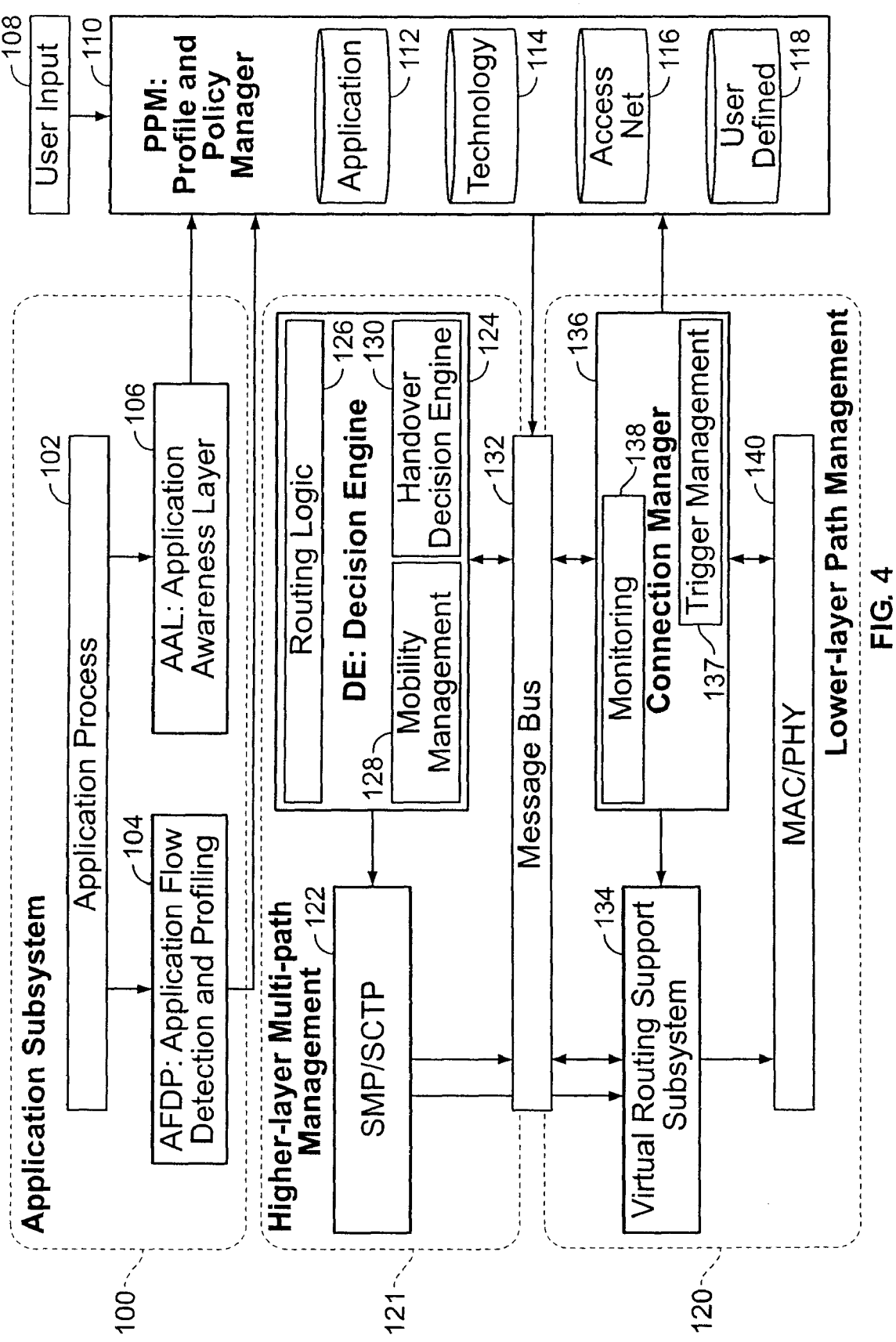
FIG. 4 is a functional block diagram showing the software architecture of the multi-access terminal of the present invention and interactions therebetween.

FIG. 4 is a block diagram showing the overall functionality and components of the software executed by the multi-access terminal of the present invention to provide communications over multiple, heterogeneous communications channels for one or more software applications (e.g., VoIP, video, etc.). The software shown in FIG. 4 can execute on any suitable operating system (e.g., POSIX-compatible) which includes a both a kernel space where the operating system kernel resides and a user space where user applications are executed.

Provided in the user space of the operating system 86 of FIG. 3 is a collection of software modules which interact with application processes 102 executing on the multi-access terminal of the present invention, and which perform a number of functions, including allowing a plurality of user applications to communicate using one or more of the communications paths established by the network interfaces of the multi-access terminal or a software-defined radio; monitoring available communications paths, traffic, and congestion; matching application requirements to available communications paths; optimizing bandwidth; and other functions. The modules include an Application Flow and Detection Profiling (AFDP) module 104, an Application Awareness Layer (AAL) 106, a Profile and Policy Management (PPM) module 110 (which can receive optional user inputs 108), a Decision Engine (DE) module 124, a Simultaneous Multiple Paths/Stream Control Transport Protocol (SMP/SCTP) module 122, a message bus 132, a Connection Manager (CM) 136, a Virtual Routing Support System 134, and a conventional MAC/PHY layer 140. The modules can be grouped as shown in FIG. 4 into an application subsystem 100, a high-layer, multi-path management subsystem 121, and a lower-layer path management subsystem 120.

The Application Flow Detection and Profiling Module (AFDP) 104 determines the requirements of traffic flows used to serve a user application. This is a challenging task as all IP communication is packet-based, relying on connectionless transmission. The addressing scheme used by the Internet model does not enable systems to differentiate traffic flows. By the term "traffic flows," it is meant the flow of IP packets that belong to the same logical connection (e.g., the IP packets that are sent between particular applications and between particular hosts). The AFDL module 104 differentiates traffic flows according to the service needs of each flow and QoS requirements. Differentiation of flows is important since a mobile host can have multiple flows for one or more services that use a combination of several different access networks simultaneously. Each combination of network links is mapped to an optimal type of service for which it is optimized.

In order to map traffic flows to specific combinations of aggregated network paths, the traffic between a mobile host and corresponding nodes must be differentiated. Traffic flow differentiation is also important to convey traffic information and characteristics down the ISO/OSI hierarchy architecture, allowing global optimization at all layers. A common example can be found in the TCP timeout and retransmission specifications, which implicitly assumed that lost packets occur due to network congestion. TCP is incapable of distinguishing between packets corrupted by bit errors in the wireless channel from packets lost due to network congestion. In another example, the knowledge of traffic characteristics allows the physical layer and the data link layer to perform more efficiently; e.g., different power control schemes can be used to meet the QoS requirements for different traffic.

The AFDP 104 determines the QoS requirements for each requested traffic flow initiated by an application or process 102. This is accomplished by estimating the traffic class using known patterns (such as destination port, IP addresses, and specific content included in requested flows) matched against theoretical profiles stored in the databases 112-118 of the PPM module 110, which also include derivative QoS requirements. It can also be done explicitly using application-level signaling protocols, if supported by the user applications. In such a case, the application uses the Application Awareness Layer (AAL) module 106 to explicitly announces its constraints, execution context, and requirements (which are expressed in terms of QoS metrics). In any case, new applicative flows are always resolved in a set of metrics that are stored in one or more of the PPM databases 112-118 for further use by the invention to adapt to the network environment. The AAL module 106 also supports adaptive feedback mechanisms, which allow an application to react to changes in nature of the transmission paths and terminal characteristics. The AAL module 106 exposes real-time network status and performance information retrieved from the PPM module 110 via an Application Programming Interface (API), which user's applications could use to adapt their respective behaviors (such as codec adaptations for a real-time video application).

Figure 7A:
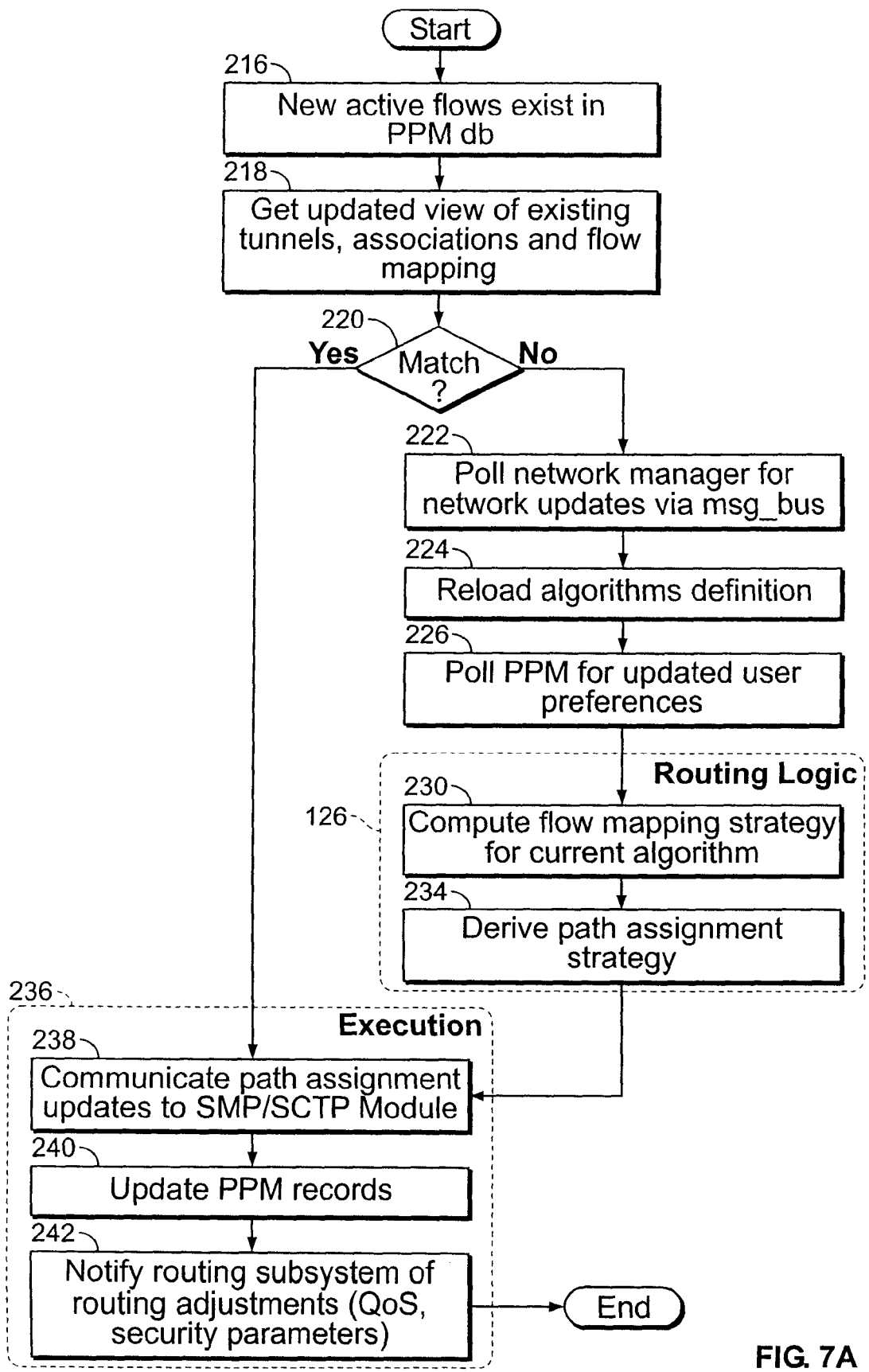
Figure 7B:
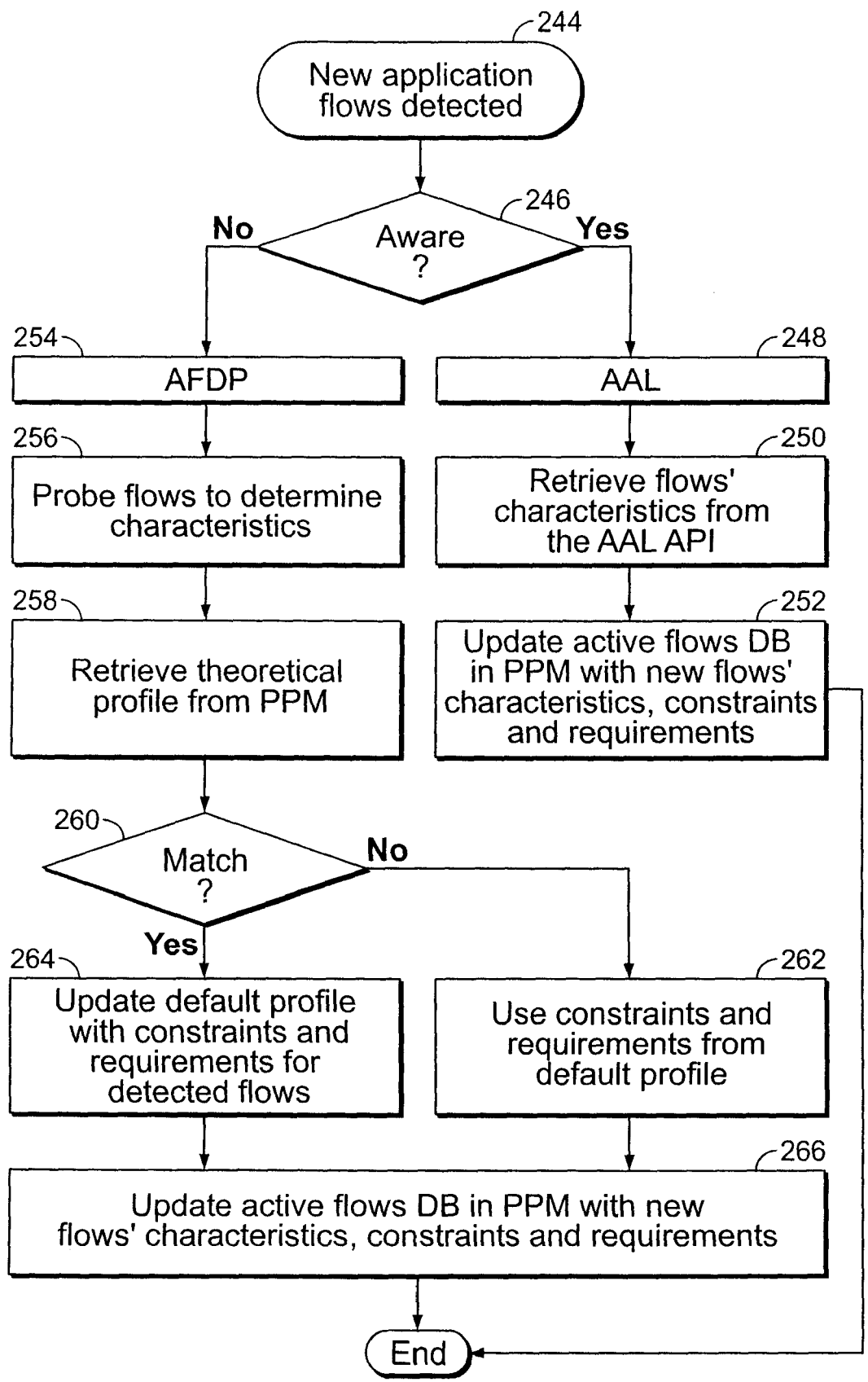

Referring to FIGS. 4 and 7B, processing logic for constructing an application profile is shown in greater detail. Beginning in step 244, a new application flow is initiated by a user application. Then, in step 246, a decision is made as to whether the new application flows are compatible with the API for Application Awareness Layer module 106. If they are not compatible, they are directed to the AFDP module 104 in step 254. In step 256, the AFDP module 104 probes the traffic flows to determine their characteristics. As described earlier, this consists of estimating the traffic class using known patterns (such as destination port, IP addresses, and specific content included in request flows). Then, in step 258, a theoretical profile matching the application's characteristics is retrieved from the PPM module 110. If a match is found in step 260, then in step 264 the default profile is updated with the constraints and requirements of the detected application flows. If there no match, a default and generic profile is used in step 262. Then, in step 266, the database containing the active application flows in the PPM module 110 is updated with the characteristics and constraints of the new application flows. The granularity of these characteristics and constraints is directly related to the accuracy of the default profile retrieved from the PPM module 110. If the detected application flows support the API for the AAL module 106, the flow characteristics are directly expressed by the application via using the API in step 250. The database of the active flows maintained the PPM module 110 is then updated in step 252 with the expressed characteristics and constraints, following the procedure of the first case.

Figure 7C:
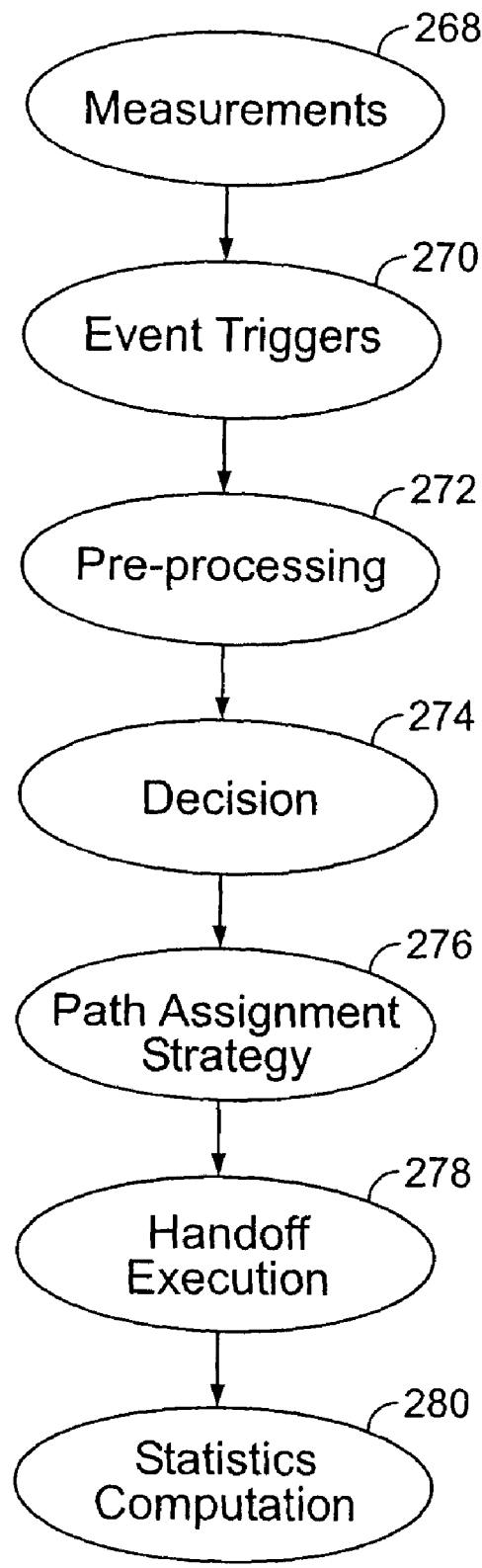
Figure 7D:
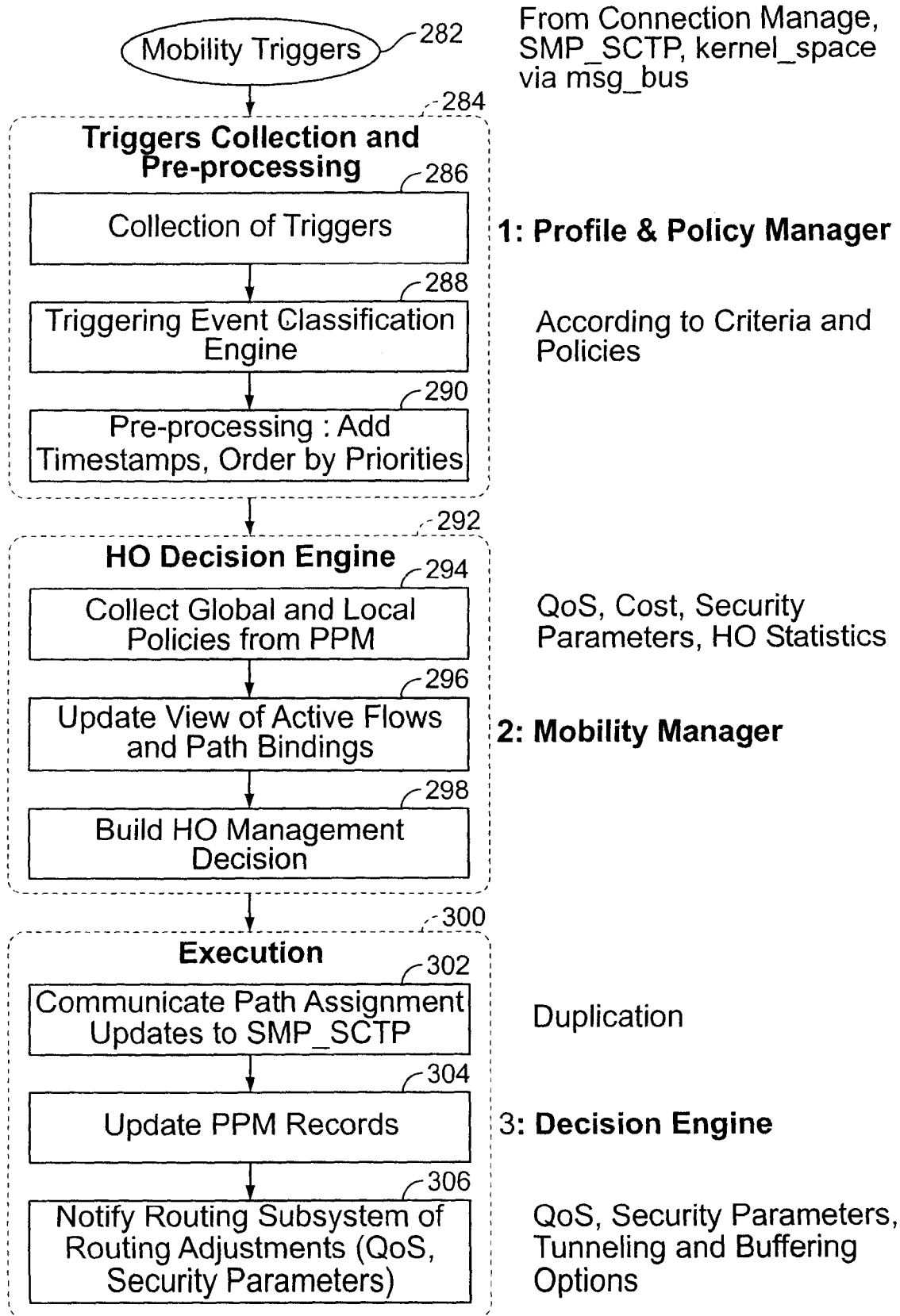
Figure 7E:
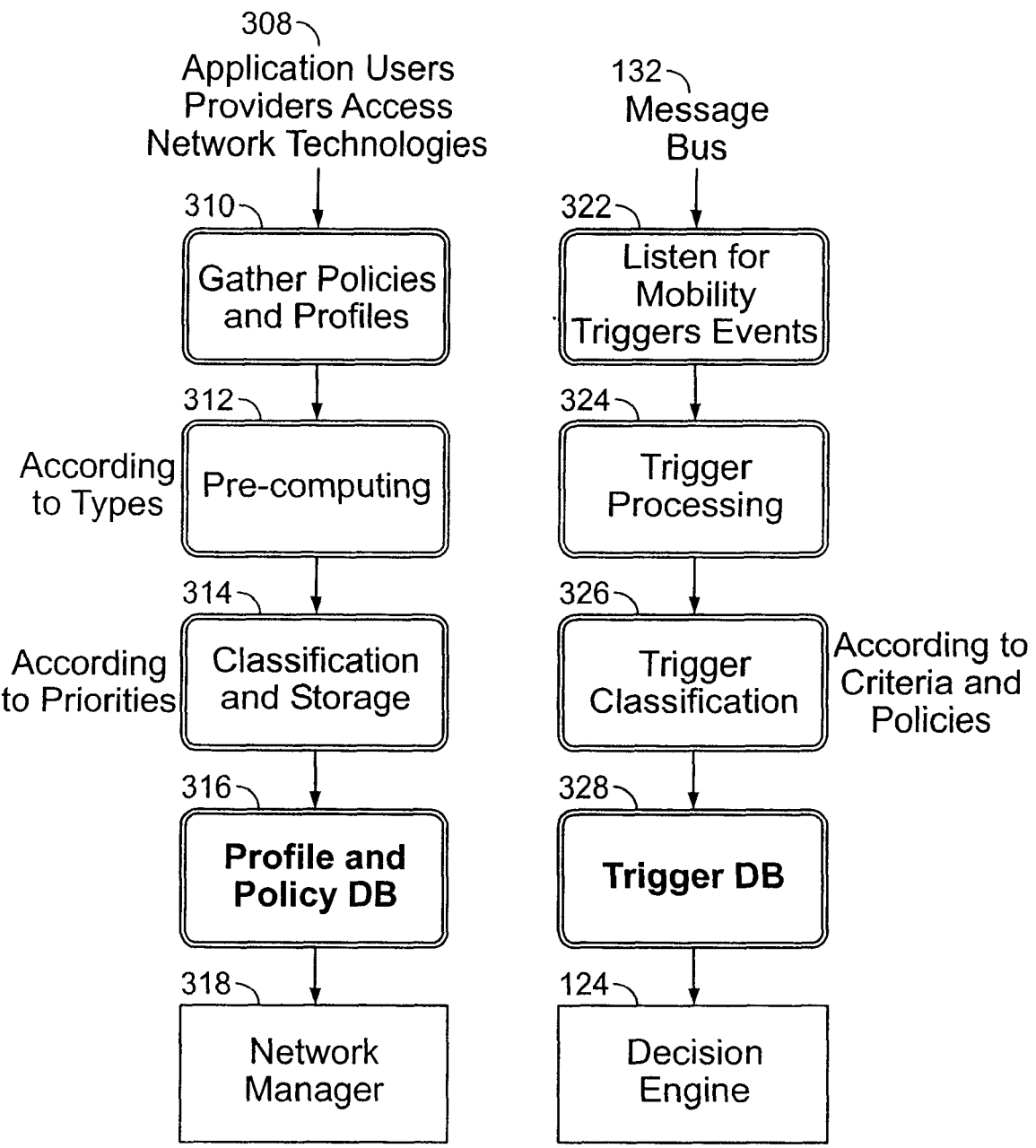

Referring now to FIGS. 4 and 7E, processing logic of the PPM module 110 is disclosed in detail. The PPM module 110 is responsible for maintaining the databases 112-118, which contain static and dynamic information, as well as for pre-processing mobility triggers and building a trigger database. The databases 112-118 provide a repository of stored application profiles and policies, stored (theoretical) network profiles and policies, real-time information, and user parameters in databases. In step 310, profiles and policies 308 corresponding to various parameters, including application information, users, providers, access networks, and technologies, are gathered. In step 312, a pre-computation step is performed according to the respective profile and/or policy type loaded for the present execution context, wherein dependencies between profiles and policies are resolved. For example, a policy could have multiple conditions depending on which profile is loaded for a given access technology, or a user preference could override part of the conditions of a particular profile. In steps 314-316, the profiles and policies are classified and stored in one or more of the databases 112-118, according to the priorities of the profiles and policies (which can be specifically expressed in the definition of a particular profile or determined by the PPM module 110 based on the nature of the profile). The profiles and policies databases 112-118 are made available for use by other software modules, such as the CM 136 and the DE 124.

Static profiles and policies could be manually entered by a user or maintained in a central database and synchronized periodically. Profiles and policies can also be dynamically updated by other software modules of the present invention according to the current context in which the mobile terminal is operating. This dynamic information could include statistics gathered for a particular access network, or performance of a particular technology under certain conditions. Static information that could be stored in the databases 112-118 could include Quality-of-Service (QoS) parameters, cost information, priorities, user preferences, etc. QoS attributes can characterize traffic characteristics (including peak rate, minimum acceptable rate, average rare and maximum burst size), reliability requirements (Bit Error Rate (BER) and/or Frame Error Rate (FER)), delay requirements (maximum tolerated delay, maximum tolerated jitters) and other user input (price, user priority). The profiles and policies could be described using an XML-based language or any other suitable language. Theoretical application profiles and policies are also stored in the databases 112-118. Such theoretical profiles include overall information about a specific type or category of application, such as a video application, an audio application, or any other type of application. Thus, for example, a standard theoretical video application profile could be stored in the database and could contain information relating to a range of data speeds typically used by video applications, QoS levels typically required by such applications, or any other type of information usually associated with video applications. Of course, any number of theoretical profiles could be created and stored in the databases 112-118.

Theoretical network profiles and policies are also stored in the databases 112-118. Such profiles include overall information about a specific type or category of network connection. For example, a profile corresponding to 802.3 (Ethernet) type of connection could be stored in the databases 112-118, and could contain information such as the range of bandwidths generally available with Ethernet connections, QoS ranges guaranteed by such a connection, and any other suitable parameter. A theoretical profile could be created and stored for each type of communications channel anticipated to be connected to the multi-access terminal of the present invention, and the profiles could be altered as desired by the user. One or more of the communications profiles stored in the databases 112-118 could then be associated with one or more records corresponding to theoretical application profiles. In this way, various communications paths and technologies can be associated with theoretical application profiles, for later retrieval and use.

Real-time information about network and communications conditions is also stored in the databases 112-118 by the PPM module 112. The databases 112-118 could contain a real-time list of each user's active traffic flows mapped to QoS classes applied to the set of available paths. Each class has specified values for a combination of the attributes to satisfy its specification. For example, four classes could be used so that conversational and streaming applications could be related to time-sensitive paths, and interactive and background applications could be related to bursty, best-effort delivery paths. The set of active paths is managed by the CM 136 and is determined using one or more physical interfaces (e.g., the access nodes 16a-16d, 36a-36d, or 56a-56d of FIGS. 1A-1C, respectively, or the network transceivers 96a-96f of FIG. 3) or a software-defined radio, and could be updated each time a communications path becomes available or unavailable. Further, the databases 112-118 could contain information about the communications parameters for each path. Thus, for example, a field could be stored in one or more of the databases 112-118 indicating specifics about a particular physical location; another field could store information about addressing schemes, and other fields could store specific security context, specific provider information, and other device properties.

The PPM module 110 also interacts with the database 118, which contains various user-defined parameters that define network- and application-related rules. For example, a user-defined parameter could be stored in the database 118 requiring that all video applications use only a certain type of communication path, and could also contain entries like authentication method, preferred access system, billing, additional terminal capabilities, etc. Any other desired parameters could of course be stored in the database 118 without departing from the spirit or scope of the present invention.

Another feature of the PPM module 110 is the pre-processing and storage of mobility triggers. The PPM module 110 listens for triggers in step 322 on the Message Bus 132 and after processing and classification in steps 324-326, builds a trigger database 328, which is immediately made available to the DE 124. Examples of triggers computed by the PPM module 110 could include instances where aggregated bandwidth is not sufficient to support the active application flows, or that multiple network interfaces are in the process of dissociating (i.e., the receivers for two technologies are approaching loss of coverage from their respective networks).

Referring to FIG. 4, the CM 136 is a system-level service module responsible for managing IP-layer connectivity (including associating with access network base stations and mechanisms specific to software radio technology, such as tuning them to enable access to selected networks) of the multi-access terminal of the present invention in the presence of various access networks. The CM 136 polls the PPM databases 112-118 to retrieve parameters specific to a network interface. These parameters may include information about location, access technology, addressing, security context, access providers, and various device properties. It manages interfaces on behalf of the Decision Engine (DE) 124 and the kernel-level transport protocol, and perform actions that are specific to the operating system used and network interfaces (and, subsequently, specific drivers) present in the multi-access terminal. The CM 136 includes multiple daemons that run in the background, including a monitoring daemon 138, a mobility daemon, and trigger management daemon. The CM 136 is not aware of the results of processing of the Mobility Management module 128 of the DE 124.

The mobility daemon of the CM 136 is a network interface controller, which supports mobility at low layers, including Physical and MAC layers (MAC/PHY) 140. It listens for events from the DE 124 such as changes to network interfaces and sends a report about the status of the network interfaces, such as availability (e.g., attached/detached, idle) of the interfaces, scan results (e.g., if a new interface is available), timeouts, and specific information about the configuration of the interfaces (e.g., change in link status, changes in IP addressing, operating system specific information) to the message bus 132. The PPM module 110 listens for these specific events, compiles them, and stores them in the network status database 116. The knowledge of these network path characteristics (including expected bandwidth for a network interface, for example) enables the PPM module 110 to pre-process specific triggers (such as when overall bandwidth is not enough to support the QoS required by running applications) to the DE 124. The handover decision engine (HO/DE) 130 within the DE 124 decides an optimal hand-off strategy for transferring communications from one communications path to another. It is also the main feed to the AAL module 106, which allows the upper application layer (or subsystem) 100 (including application processes 102) to become aware of the network state (allowing performance improvement through adaptation, e.g., cross-layer optimization) and specific events happening at lower layers, such as the lower path management layer 120. Incoming events from the DE 124 may include setting the IP configuration for specific network interface, supplying a list of active interfaces, manipulate routing tables, and initiating scanning for a specific network interface.

The Monitoring daemon 138 of the CM 136 is a resource-monitoring daemon, responsible for gathering measurements for all network interfaces. This real-time information is passed to the PPM module 110 for storage in a dedicated database. Information could include connection availability, packet error rate, Mean Time To Recovery (MTTR, the average time for a hardware or software interface to recover from a non-terminal failure), congestion, latency, Round Trip Time (RTT), signal quality, and various statistics about usage. The PPM module 110 uses this information for building a network state profile for the multi-access terminal.

The Trigger Management daemon 137 listens to the information retrieved by the Monitoring daemon 138, when such information is of importance. It also generates a special triggering event (containing OSI Layer 1 and Layer 2 information) on the message bus 132 that is intercepted by the DE 124 for immediate processing. An example of such special trigger event could be a network connection that is suddenly disassociated, due to a lack of coverage (black-hole) or because a network cable has been unplugged. In this situation, the DE 124 decides the optimal hand-over technique to handle the interface loss and re-computes an optimal routing graph in a timely fashion to avoid performance loss. It should be noted that the DE 124 and the PPM module 110 make most of the mobility triggers. These are special cases implemented to cut the reaction time of the mobile host to sudden interface changes. Special triggers are not exported when the Monitoring daemon 138 detects that the signal strength for a wireless interface is dropping below a certain threshold, indicating that the interface may soon loose communication.

The DE 124 is a master module that coordinates user-space modules and interacts with kernel-side processes. It is modular, agnostic to specific algorithms and protocols, and easily extensible. The DE 124 is in charge of maintaining the traffic distribution across the set of active virtual links (aggregation of multiple "real" physical network connections, i.e., a "vlink") based on access network characteristics reported by the SMP/SCTP module 122 and the CM 136, as well as the QoS requirements defined by the traffic flows. The DE 124 contains a routing logic module 126 for mapping the traffic flows to the set of active communication paths. As will be discussed hereinafter in greater detail below, traffic distribution performed by the DE 124 is function of a number of parameters, including terminal-related information, mobility support information, network state and performance, traffic parameters, cost management reports, priorities, policy enforcement, and user preferences.

Using the information collected via its satellite modules (including PPM module 110, SMP/SCTP module 122, CM 136, and VRSS 134), the DE 124 aggregates and prioritizes service, predicts service requirements, checks and enforces polices, monitor service performance, computes capacity estimates (such as CPU load, average bandwidth, average latency) to serve traffic, performs fault tolerance planning, and as stated above, routing and strategy algorithm selection. Within a particular vlink, costs are attributed to each stream. Link cost reflects the weight of a stream with respect to a given metric. Multiple algorithms and equations can be implemented by the DE 124 to compute the weight for each stream. Typically, the weight is defined as an n-tuple of metrics: delay, jitter, bandwidth, availability, price, and the like.

The routing logic module 126 maps the traffic flows for the various application processes 102 to the set of active communication paths. Depending on the network state and scenario, the routing logic module 126 defines an optimal vlink (expressed in terms of routing protocol uses, routing metrics, and weights of these metrics) to reach a level of granularity of the individual flows. The DE 124 can route across multiple heterogeneous access networks; as such it is agnostic to the type of network and agnostic to the type of service (such as multicast, unicast, peer-to-peer services). The DE 124 supports multiple QoS routing schemes, wherein the lowest QoS available provides the best delivery service. The DE 124 also has the ability for network-awareness content processing, wherein its routing logic instructs applications (via the AAL module 106) and routing subsystem to perform specific processing on a particular service flows. Examples of processing are adaptation (e.g., transcoding, such as using different codecs to lower bandwidth requirements for a voice application), independent flow routing, and caching. The DE 124 also supports context-aware routing. To cope with changing conditions, the DE 124 adapts the routing and strategy selection. This adaptation responds to triggers received by satellite modules. The triggers include: changes in the underlying network (QoS characteristics, attributes, connectivity), changes in the availability of access networks, changes in the user or service context/preferences, internal decisions of the DE 124 (operation policy, timer-based policy updates, threshold-based policy updates) and the introduction of new application flows. When any of these triggers is received, the routing logic module 126 in the DE 124 is called and the routing logic functions are re-applied. The strategy and decision are then exported to the CM 136, SMP/SCTP module 122 and VRSS 134 via the Message Bus 132. Finally, the DE 124 has the ability to perform multi-path routing; it is able to adapt distribution strategy for flows with different QoS requirements and perform load-balancing on a per-flow basis.

The routing logic module 126 exports an "optimal path graph," which consists of the definition of a virtual link that meets the individual QoS requirements of each of the flows requested by the various user application processes 102. The cost of the vlink is the cost of each individual streams forming the vlink. The DE 124 communicates with the SMP/SCTP module 122 and VRSS 134 for post-decision packet processing. The "optimal path graph" is pushed to the running kernel-side routing implementation, directly affecting the distribution of existing traffic packets across the vlinks.

Referring to FIGS. 4 and 7A, processing logic according to the present invention for mapping new application flows is shown in detail. In step 216, new active application flows in the databases of the PPM module 110 are detected. Then, in step 218, updated views of existing tunnels, associations, and flow mapping settings are retrieved. In step 220, the DE 124 determines whether existing vlinks can support the characteristics and constraints of the new flows. If the existing network context can support these new flows, execution process 236 is activated, wherein in steps 238-242, respectively, the DE 124 informs the SMP/SCTP module 122 of the new path assignment, updates the PPM module 110 database records with the binding of the new flows to vlinks, and notifies the VRSS 134 (routing sybsystem). The VRSS 134 then makes the necessary routing adjustments to support the new flow streams (which could include specific QoS attributes or security parameters of the flow). In step 220, if the existing network context cannot support the new flows, step 222 is executed, wherein the DE 124 polls the Connection Manager 136 for an updated view of the network situation (including results of current scanning and inactive interfaces which could be used). In step 224, the DE 124 reloads the current set of algorithms and in step 226 the DE 124 asks the PPM module 110 for updated user preferences (such as updated priorities and updated cost information). Routing logic 126 is then executed, wherein an updated flow mapping is computed in step 230 for all active application flows. Finally, in step 234, an updated path assignment strategy is derived and is communicated to the SMP/SCTP transport protocol 122 for immediate use. The PPM module 110 and VRSS 134 are then updated by process 236, described above.

Referring to FIGS. 4 and 7D, the processing logic of the Mobility Management module 128 is shown in detail. When the CM 136 and/or the SMP/SCTP module 122 detect connection events, they are communicated to the PPM module 110 via the message bus 132. Events are detected based on measurements performed at Layers 1 through 3 of the ISO/OSI stack, monitoring active connections, network interfaces, and available active networks satisfying active criteria and policies (for example, a more cost-effective connection, lower latency, or higher throughput). Examples of triggering events could include "$link_down" (link not available), "$link_up" (link is available and a routable network address is set), "$new_link_available" (a new available has been found, but is not yet routable), "$upcoming_link_failure" (an upcoming failure is predicted for this link), "$link_metric_poor" (performance for a given metric below the pre-defined threshold), etc. The triggers are computed using a set of suitable, known metrics such as RSSI/SNR, CIR, BER, BLER measurements, cell ranking functions, various cost functions, distance, and location information. Mobility management information is processed in three phases, including triggers collection and pre-processing phase 284, handover decision engine 130 processing phase 292, and execution phase 300. In phase 284, triggers are collected in step 286 and pre-processed by the PPM module 110. Then, triggering events are classified in step 288 by order of priorities and then time-stamped and bundled together, if possible, in step 290. In phase 292, the triggering events are then sent to the HO/DE 130 of the DE 124 for processing. In step 294, global and local policies are retrieved from the PPM module 110, and relevant to the events triggered. Examples of policies include QoS parameters, security restrictions, mobility scenarios (horizontal or vertical handoffs, administrative boundaries crossing), and the like. In step 296, the HO/DE 130 updates its view of the active flows mapping in order to determine the impact of the triggering events on the current flow assignment strategy based on the connection dimension parameters expressed in the triggering event. The HO/DE 130 outputs a set of decisions calculated by suitable algorithms which use trigger priority, trigger type (type of hand-over), velocity, quality of the actual networking environment, severity of the impact, and handover timing as inputs. Such algorithms could include known algorithms such as power-based algorithms, dwell-timers, averaging windows, hysteris recognition, fuzzy logic, and neural networks.

In step 298, the HO/DE 130 builds a management decision, which describes the network update strategy and includes the type, time, and target of the hand-over or network addition or deletion of the sets of available networks pipes (e.g., redefining the nature of the vlinks). The network update strategies include hard or soft handoffs, seamless handoff, loss-less handoff, fast or low latency handoff, proactive or reactive handoff, addition, deletion or re-negotiation. It is important to point out that in order to minimize packets losses and delays and avoid service interruptions due to the mobility effect, the Mobility Management module 128 performs stream competition hand-over. This consists of duplicating traffic packets across multiple streams within a vlink. This technique avoids packets losses when a network path is failing. It can be triggered by special triggers such as the "$upcoming_link_failure" trigger described above. Each stream competes to transmit the traffic packets over to the corresponding packets. The receiving end first reassembles the packets arriving, while the packets arriving last are discarded. This duplication is made at the cost of performance but only for a very short time.

The HO/DE 130 applies fine-grained policies to minimize redundant transmit packets and this is performed only when there no other alternative, for example, when the vink is composed of only one network connection and this connection is on the verge of failing. In phase 300, the decisions made by the HO/DE 130 are then communicated in step 302 to the message bus 132 to inform the VRSS 134 of the changes to apply. The updated path assignment routing in the DE 124 is also informed, and it communicates the new path assignment to the SMP/SCTP module 122. Finally, the PPM module 110 is informed in step 304 and its records are updated. The context transfer is done at OSI Layers 2 and 1 by the CM 138, which applies the handover decisions made by adding, deleting, and proceeding with the hand-over for the connections impacted. It also performs all of the necessary signaling updates for the access nodes involved, including access capabilities, link negotiation, and the like. At the lowest layer, operations include registration, association/re-association, and dissociation. The context transfer is performed in step 306 at OSI Layer 3 by the VRSS 134, which adjusts different user plane mechanisms, such as tunneling, buffering, and/or routing updates such as routing tables, anchoring, bicasting, and the like.

Upon completion, the DE 124 is alerted of the status of the operation performed and the PPM module 110 repository is updated. The path assignment strategy is then re-computed and then sent to the SMP/SCTP module 122. Once the network update procedure is executed, the Mobility Management module 128 conducts a series of performance measurements, which can include throughput impact, handoff delays, packets loss, and handoff rates. This statistical information is collected and appended to the network profile history relevant to the trigger event type in the PPM module 110.

FIG. 7C is a flowchart showing processing logic of the mobility management module 128 of the DE 124 of FIG. 4. In step 268, measurements are performed to record the performance and activities of the networking environment. Then, in step 270, these measurements trigger mobility events. In step 272, these events are pre-processed to prioritize them and bundle events relating to the same condition. The preprocessing step 272 leads to a hand-off decision in step 274. From the hand-off decision made, a new path assignment strategy is derived in step 276. Finally, in step 278 the hand-off is executed, and in step 280, statistics are computed. Examples of statistics computed include average hand-off time (including lower and upper bounds), number of handoffs performed between access network access technologies, average impact of the handoffs (in terms of packet loss, increased latency), etc.

Provided in the kernel space of the operating system (see operating system 86 of FIG. 3; see also SMP/SCTP module 122 of FIG. 4) is a set of modules that enhance the transport and routing layers defined in the operating system. The connection arrangement described in this invention uses a relatively new transport protocol known as the Stream Control Transport Protocol (SCTP). It is a connection-oriented protocol that transports data across one or more communications channels using independent, sequenced streams of data. The standards for the SCTP protocol are defined in RFC2960 promulgated by the Signaling Transport (SIGTRAN) group of the Internet Engineering Taskforce (IETF). RFC 2960 can be found on the Internet website at http://www.faqs.org/rfcs/rfc2960.html and is expressly incorporated herein by reference in its entirety. It provides end-to-end communication between applications running in separate hosts. SCTP operates on top of connectionless packet networks. It offers connection-oriented, reliable transportation of independently sequenced message streams. The main difference between SCTP and TCP/IP is multi-homing, i.e., the provisioning of several streams within a connection (an association in SCTP terminology) and the transportation of sequences of messages instead of sequences of bytes (multi-streaming). SCTP can handle multiple address pairs on both endpoints of a connection. One of the possible address pairs is used as a primary path while the others are used for redundancy purposes. Multi-homing and the heartbeat mechanism of SCTP enable monitoring of the connection and allow automatic connection fail-over whenever the loss of a session is detected in the primary path. The current implementation of SCTP defined by the standard is not sufficient to perform the operations of the present invention, and accordingly, must be modified. Indeed, SCTP was originally designed with wired networks in mind, following the strict rules defined by the ISO/OSI model. Transport-level and network-level operations must be disassociated. Also, SCTP utilizes multiple paths between two endpoints for retransmission of lost data chunks only in case of path failure. Under normal conditions, all packets are routed through the primary path defined during the initiation of the association.

The present invention extends the standard SCTP implementation to address the aforementioned concerns. One extension allows the use of multiple paths for concurrent transmission of data chunks. This, is turn, requires the introduction of mechanisms to manage congestion avoidance independently on each path, as SCTP is designed to use only one path at a time. Moreover, the congestion avoidance mechanisms for SCTP are equivalent to the ones used in TCP/IP and assume that packet loss is only caused by congestion. However, wireless networks generally encounter a higher Bit Error Rate (BER) and more delay spikes than wired networks; this non-congestion-related loss severely degrades the performance because SCTP is required to "back off" in data transmission frequently. Another extension according to the present invention augments SCTP with enhanced flow control and congestion avoidance mechanisms, using selective acknowledgments and a cross-layer feedback between the transport layer and the data link layer, allowing SCTP to differentiate loss due to the wireless channel from congestion loss. Congestion flow control is performed on a route basis, while an aggregated flow control is performed for each entire SCTP association. In this extension, corresponding nodes use the SCTP association buffer to hold data chunks regardless of the transmission path used.

Finally, the current SCTP standard assumes that paths are exchanged during the association setup and cannot be modified without re-initiating a different association. To address this, the present invention use a protocol extension for SCTP called Address Configuration Change (ASCONF), and another extension of SCTP called the ADDIP protocol extension as described in ADDIP Draft, which can be found on the Internet at http://www.ieff.org/internet-drafts/draft-ieff-ts-vwg-addip-sctp-09.txt and which is expressly incorporated herein by reference in its entirety. Other modifications to the SCTP standard include buffer management capabilities. The extensions (i.e., load-sharing support, feedback mechanisms, ASCONF/ADDIP extensions, buffer management modules, congestion avoidance mechanisms and flow control mechanisms) of the present invention, which are added to the kernel-level implementation of the SCTP proposal, are referred to herein as the Simultaneous Multiple Paths Stream Control Transport Protocol (SMP/SCTP) module 122.

Figure 5A:
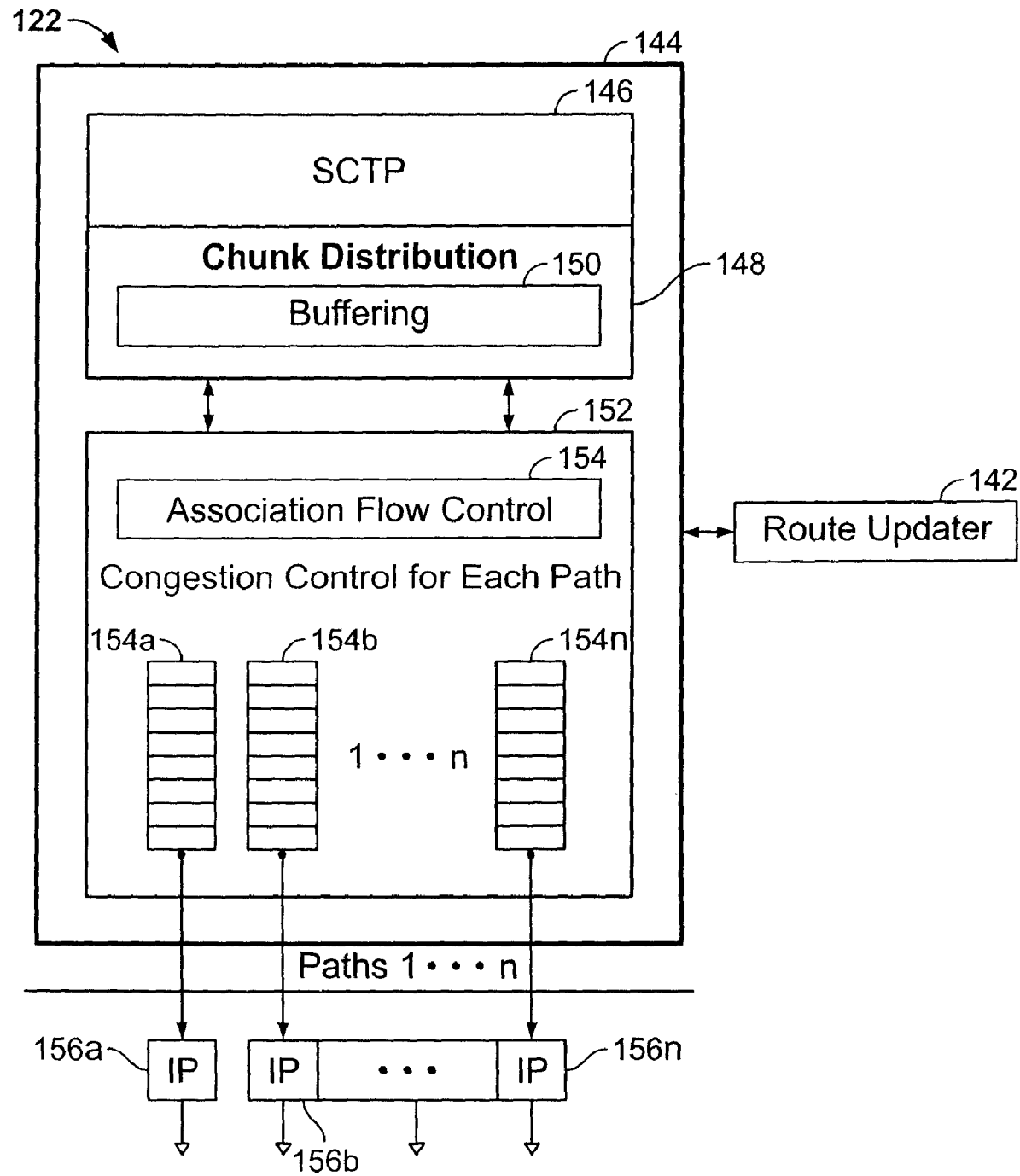
FIG. 5A is a block diagram showing the architecture of a modified transport protocol utilized by the present invention.

With reference to FIGS. 4 and 5A, the architecture of the SMP/SCTP module 122 of FIG. 4 is presented in detail. The SMP/SCTP module 122 consists of three main building blocks, which include a Route Updater unit 142, a Chunk Distribution (CD) unit 148, and a Flow Control unit 152 added to the standard kernel-level implementation of the SCTP protocol 146. The Chunk Distribution unit 148 and the Flow Control unit 152 are collectively indicated at 144. The CD unit 148 is responsible for assigning data chunks to the transmission paths maintained by the CM 136, and includes a buffer 150. The strategy for path assignment is defined by the DE 124, based on the characteristics of the traffic (e.g., QoS requirements for each stream) and the current network state. The DE 124 constantly updates the path assignment strategy and some simple strategies include dispersion, duplication, and multiplexing. These basic strategies can efficiently be used to improve security and reliability. The default strategy is to multiplex the data chunks over the set of transmission paths in a round-robin fashion, weighted by the size of the congestion window relation and bandwidth estimates for each path. The Route Updater (RU) unit 142 retrieves the data transmission strategy defined by the DE 124. Another strategy could be to duplicate data chunks over a set of streams as required by the implementation of soft handovers as explained previously. The association flow control module 154 provides congestion control for each SCTP association 154a-154n and their associated IP data streams 156a-156n. Finally, measurements of the performance of each path are exposed to the CM 136 via an operating-system specific interface. Examples of measurements include congestion window size, slow-start threshold size, average Round-Trip Time (RTT), and Retransmission Time-Out (RTO) for each path.

Figure 5B:
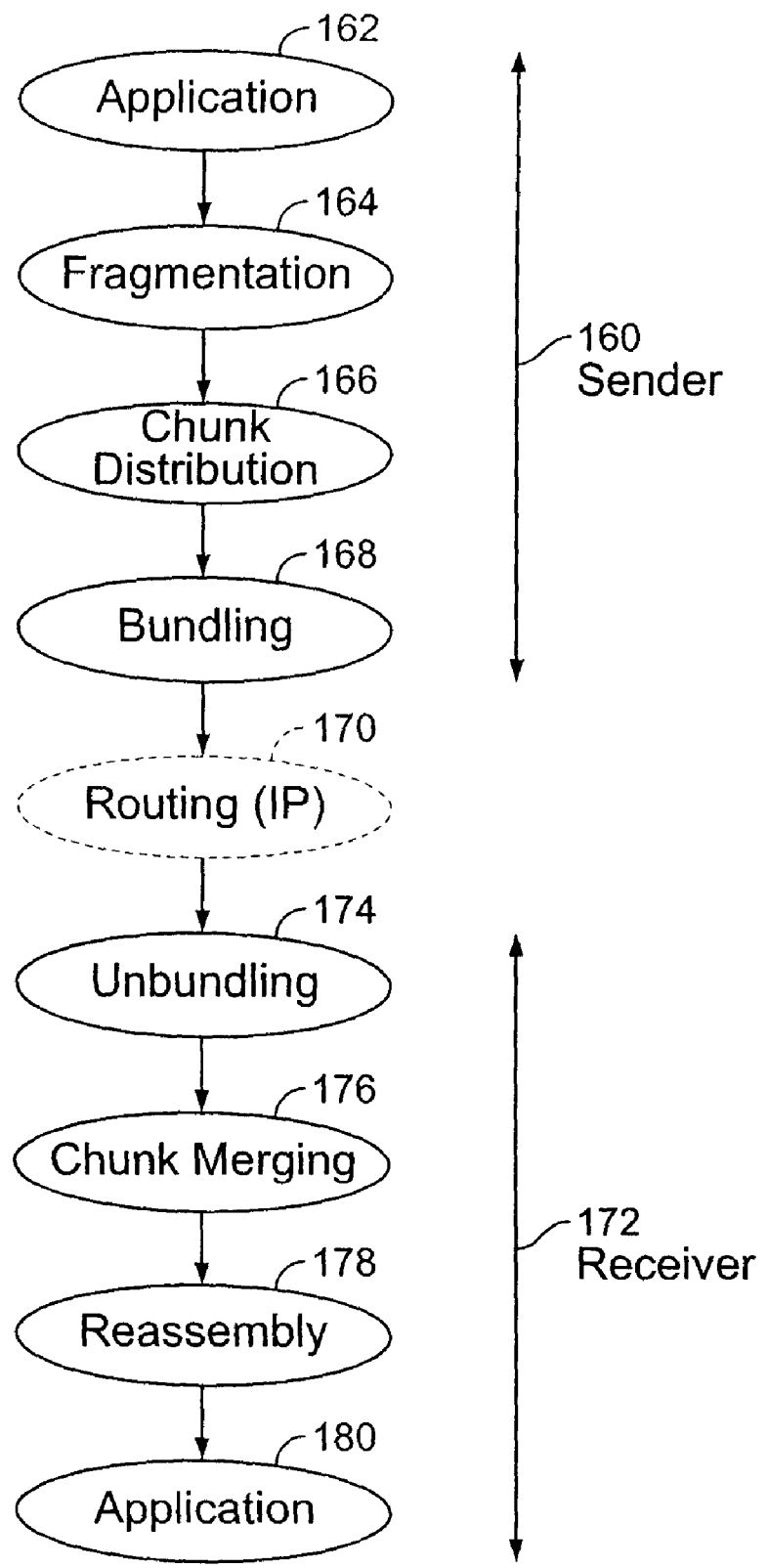
FIG. 5B is a flowchart showing processing logic implemented by the modified transport protocol of FIG. 5A.

With reference to FIGS. 4 and 5B, processing logic according to the present invention for transmitting application-level flows between two endpoints is presented in detail. The processing logic is shown from the perspective of a sending node 160, as well as a receiving node 172. Beginning in step 162, application flows are received, and in step 164, application flows are broken into fragments (referred to as "fragmentation"). These fragments or chunks are then mapped in step 166 to vlinks based on the path assignment strategy defined by the DE 124, in a process referred to as "chunk distribution." Then, in step 168, chunks assigned to the vlinks are concatenated into bigger chunks, i.e., bundles. These bundles include specific addressing semantic so that they can be transmitted over physical network interfaces. The VRSS 134, along with its associated routing stack forwards these bundles in step 170 to the next logical hop of the routing path for each network interface. Upon reception of the bundles by the routing stack at the receiver 172, the bundles are unbundled in step 174 to form chunks. In step 176, chunks belonging to the same logical stream are merged. Finally, in step 178, the chunks are reassembled and in step 180, transmitted to the application layer.

It should be noted that the multi-access terminal is not limited to the use of the SCTP protocol, and any suitable multihoming or multi-streaming protocol with load-sharing capabilities could be used without departing from the spirit and scope of the present invention.

Referring now to FIG. 4, the VRSS 134 provides the functionalities needed for the establishment and management of vlinks between corresponding nodes (including, for example, other mobile terminals in an ad-hoc setup, providing multi-hop support or to corresponding gateways). The VRSS 134 resides on top of the IP layer and below the transport layer (which would represent a new "Layer 3.5" in the ISO/OSI model). As defined earlier, vlinks (virtual links) are an end-to-end network connection for aggregating multiple "real" network connections. These "real" network connections compose the streams forming an SCTP association. Vlinks differ from the definition of a SCTP association, in that each stream forming a vink can be obtained through the use of tunneling techniques. Vlinks are created and managed above the network layer, providing compatibility with legacy routing systems and protocols since they only access the headers of the IP headers to perform their forwarding tasks.

Some sophisticated routing devices and protocols can perform checks on the encapsulated information, and can look up the contents of the IP packets (data). Sometimes, if the transport layer identification field in the IP header does not match any "known" protocols (i.e., UDP/TCP/RTP (Real Time Protocol)), packets can be discarded. To present this from happening, the VRSS 134 uses probe techniques to determine if the packets are being discarded, and automatically uses encapsulation techniques at the network layer to address these issues. This consists of encapsulating the vink packets into regular network datagrams (IP packets) at the sender for some of the streams composing the vlink connection. The protocol header sequence is thus IP/IP/SMP_SCTP/APP/DATA. These packets are extracted at the receiving end of the network connection and re-assembled at the transport layer as if no encapsulation happened. Similar techniques are commonly used by other protocols, and are very efficient (efficiency is in this case expressed in terms of processing needs). Indeed, the encapsulation/de-encapsulation process is performed directly at the network layer, which usually is implemented at the core of the operating system (i.e., in kernel space). Also, the additional overhead of this technique (because additional headers are appended to every packets) is minimal and does not impact the performance of the communication. Further, the VRSS 134 implements header compression techniques as specified by the Robust Header Compression (ROBC) standard, defined by the IETF and available on the Internet at http://www.ietf.org/html.charters/rohc-charter.html, the entire disclosure of which is expressly incorporated herein by reference in its entirety. This technique can reduce the size of the headers to a few bytes, and can assure that the decompression is semantically identical to the uncompressed original. This technique uses the property that most fields in a stream are either constant or vary in a predictable way. ROBC is specially optimized for cellular links or similar links, i.e., links with high error rates and long RTT; it also supports the SCTP standard as defined by the IETF. VRSS 134 implements a slightly different version of the ROBC standard, which has been modified to support the unique extensions provided by the SMP/SCTP module 122. VRSS 134 also supports TCP/UDP/IP-to-SCTP encapsulation for legacy applications that do not support SCTP socket calls (e.g., applications developed before SCTP became a standard) to benefit from the extra features provided by the SMP/SCTP module 122 (essentially, link aggregation). This technique is used by VRSS 134 when the present invention is embedded in a router and the application flows are not initiated locally.

Figure 6:
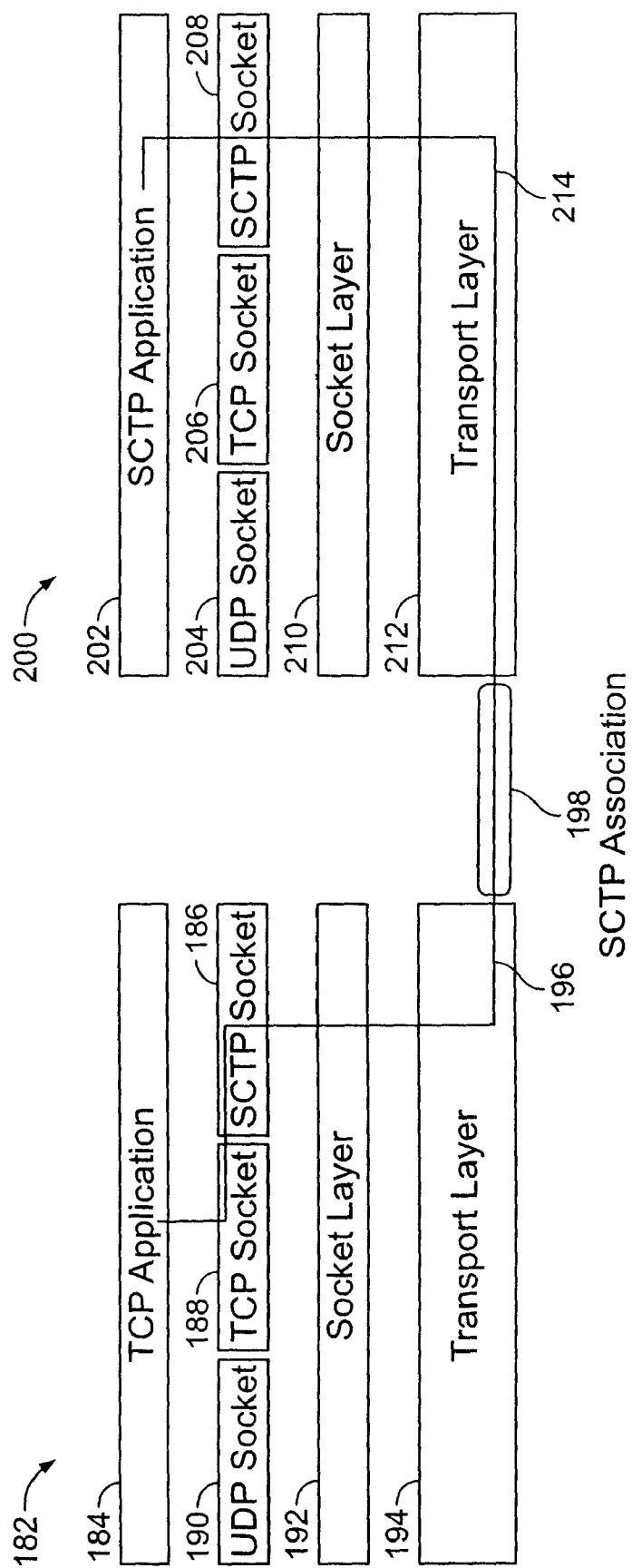
FIG. 6 is a diagram showing the operation of a protocol translator according to the present invention, implemented as a TCP-to-SCTP proxy.

Referring to FIGS. 4 and 6, a TCP-to-SCTP proxy mechanism implemented by the VRSS 134 is shown in detail. The proxy allows a TCP traffic 182 (generated by a TCP application 184), as well as UDP traffic, to be transformed into SCTP traffic 200 (for use by an SCTP application 202). An SCTP association 198 is established from the TCP application 184 through a TCP socket 188, an SCTP socket 186, a TCP socket layer 192, an a TCP transport layer 194, as well as through an SCTP transport layer 212, an SCTP socket layer 210, an SCTP socket 208, and to the SCTP application 202. The SCTP traffic 200 could also include a standard UDP socket 204 and a TCP socket 206. In the case of a UDP-to-SCTP proxy, the association 198 would extend from a UDP application (not shown) and through a UDP socket 190, as opposed to the TCP socket 188.

The VRSS 134 also secures the information sent out using elements of the Security Architecture for the Internet Protocol, which is defined by IETF RFC 2401 and is expressly incorporated herein by reference in its entirety. The techniques used to secure outgoing information are defined on a per-user basis, based on user-defined policies polled from the PPM module 110. Finally the VRSS 134 introduces the concept of "Smart Caching" (intelligent buffering management). Traditional buffering techniques allow information to be cached when a terminal experiences connectivity problem (due to the effect of mobility or unreliable network connections). The VRSS 134 performs a more fine-grained mechanism as it performs content-based and time-sensible caching. These techniques evaluate the content of data to be sent and the expiration date of the data to be sent out, only caching information that has the highest priority (defined in terms of QoS metrics) and which will still be acknowledged as useful (from an application standpoint) when it reaches its destination. Additional content-based caching can be performed by the destination when the transport protocol detects that the mobile terminals are performing handovers (changes in their set of active communication paths). This technique provides smoothness guarantees for streaming and interactive content, but cannot be employed for real-time content.

Figure 8A:
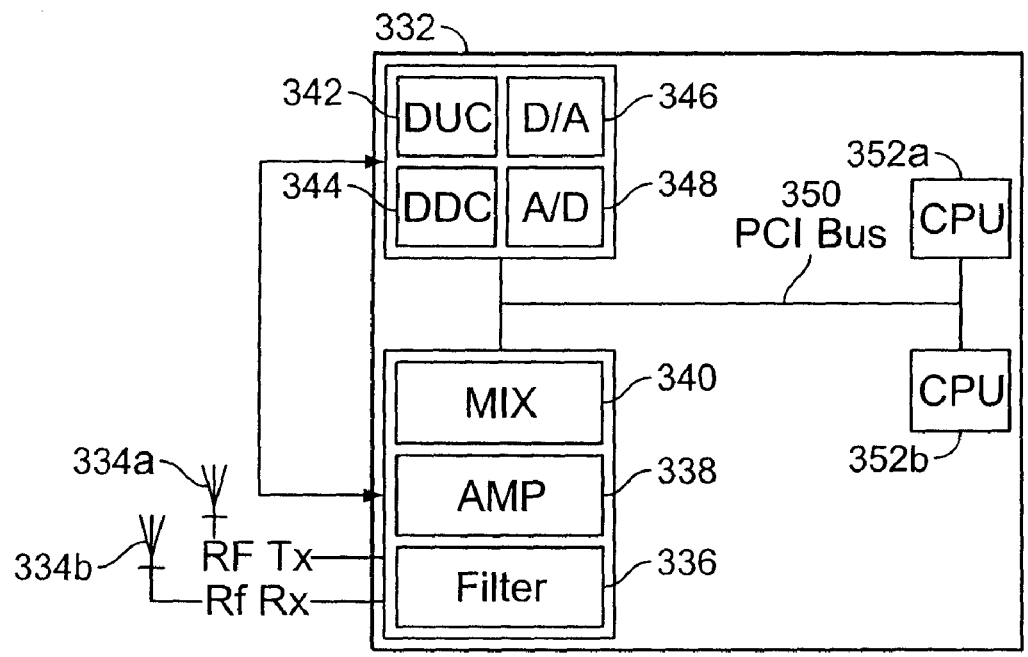
FIG. 8A-8B are block diagrams showing another embodiment of the present invention implemented using software-defined radio technology.
Figure 8B:
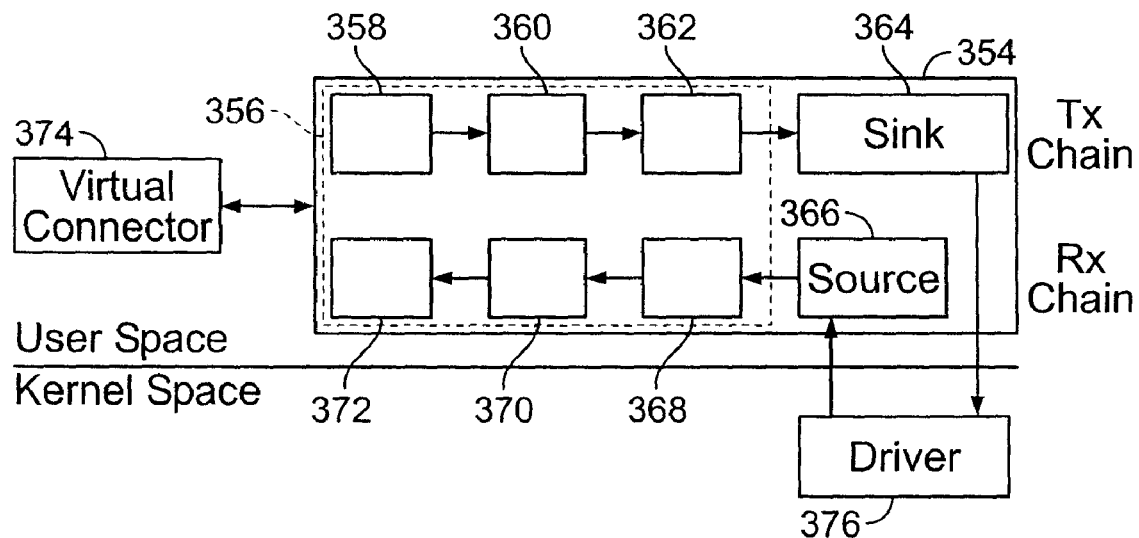

As mentioned earlier, the present invention could be operated with a software-defined radio, as is known in the art. Such radios are shown in FIGS. 8A-8B. As shown in FIG. 8A, a software-defined radio 332, attached to one or more central processing units (CPUs) 352a-352b via a bus 350 (e.g., PCI bus) could be implemented, and could include transmit and receive antennas 334a-334b as well as standard RF transceiver components including a filter 336, an amplifier 338, and a mixer 340. The radio 332 could also include also include a frequency up converter 334 and down converter 344 for replacing the plurality of antennas (i.e., the antennas 97a-

97f shown in FIG. 3, and any associated multiplexer/demultiplexer, if used), thereby allowing transmission across a wide variety of frequency bands using a single antenna. The software-defined radio 332 is used to implement the physical-layer protocols for each desired network. This eliminates the need for multiple network cards, and satisfies the FCC's desire for the development of the so-called "Cognitive Radio."

A single software-defined radio can support multiple wireless communication standards depending on what software application is running. The use of software-defined radios enables dynamic adaptation to environmental conditions, rapid switching across many different channels and service providers, and reconfiguration of the device between multiple low-rate channels and a single high-rate channel. The software-defined radio 332 could include the Red Runner "WaveFront" (full duplex RF at 902-928 MHz, IF at 57-83 MHZ) and the Red Runner "WaveRunner" radios (IF at 57-83 MHz), and could include A/D and D/A capability (represented by blocks 346 and 348) of 14 bits resolution at 93 Msamples/sec, and 8 channels of digital down conversion ("DDC") 344/ digital up conversion ("DUC") 342. These hardware platforms allow an operating system to support the implementation of the entire physical layer signal processing as a standard application program running on top of a POSIX-compliant operating system, such as the operating system 86 running on the processor 90 of FIG. 3, and SMP/SCTP module 122 software (see FIG. 4).

Another software-defined radio capable of being used with the present invention is shown in FIG. 8B. The radio includes a plurality of user-level processes 356, which include transmit chain processes 358-362 and receive chain processes 3368-372. A sink 364 is in communication with the transmit chain processes 358-362 and a software driver 376 via the transmit chain, and a source 366 is in communication with the receive chain processes 368-372 and the driver 376 via the receive chain. A virtual connector 374 allows one or more software applications in the user space to communicate with the software-defined radio. The transmit chain processes 358-362 implement four steps: adding header information in process to payload data received from the virtual connector to form a packet, chopping the packet in step into a vector of bits, converting the bits to symbols in step and generating a hop offset using a pseudorandom generator, and modulating the symbols using a frequency modulator. The receive chain processes 368-372 implement five steps: using a frequency demodulator to compute phase difference between samples and to integrate the pseudorandom generator hop offset to dump received symbols in process, concatenating the bits into words, handling synchronization, parsing the header, and producing the payload, which is passed to the application via the virtual connector.

The present invention has several advantages over prior art wireless communication methods. Equipped with the multi-access terminal of the present invention, civilian and military first responders (and ordinary consumers) would have improved coverage, permitting them to roam within military/police bands and/or across commercial cellular and unlicensed bands. The first responders (and ordinary consumers) can load-share bandwidth capacity across a set of available networks to improve reliability. For example, if a network fades, data could be relocated to a network with better performance without the need for user intervention in a way similar to handoffs between base stations for user of wireless cellular networks. Similarly, users could "sum" capacity across a set of networks to realize the bandwidth needed for high quality images or video, i.e. a mobile terminal can operate over multiple channels at the same time. An officer in a remote part of a metropolitan area could receive the same high quality images of suspects as his/her colleagues that are within range of a police WiFi network. Users would have coverage wherever any wireless network, including satellites, exists. This would provide wireless users with the performance and reliability currently experienced only by wire line users. Another advantage of the present invention is that the provisioning of access to multiple types of networks in a given area can be done without the need for re-development of the existing wireless base station infrastructure, significantly reducing costs and delays in introducing broadband services.

The applications for the present invention are broad. The initial market is first responders such as municipal law enforcement agencies. The multi-access terminal of the present invention provides enhanced communications capabilities for improving data coverage or supporting instantaneous broadband channels for uploading crime-scene videos to HQ commanders or downloading mug shots to police cars in the field. These new capabilities can be provided without investing millions of dollars in new infrastructure facilities. Indeed, with the multi-network communicator technology, these capabilities can be provided on an as needed basis, equipping only the police/fire or medical services vehicles that are most urgent. The result is early deployment at substantially reduced costs.

For commercial Voice over Internet Protocol (VoIP) services over 802.11 hot spots, the disadvantage of access to only a single access point is overcome with the multi-access terminal of the present invention, because associations are developed with all in-range access points. Data is distributed across all of the access points if their performance can accommodate the requirements of VoIP applications in terms of latency, average jitters and bandwidth. The objective is to send traffic across the set of access point, which combined, will provide the best communication experience. In other words, as the user moves out of range of an access point, traffic is automatically transferred to a new access point. Users of the multi-access terminal do not have to remain stationary to preserve their call.

In another commercial application, the multi-access terminal of the present invention provides broadband anywhere for business executives and college students, not simply in coffee shops that have 802.11 hot spots. Over time, there is also the possibility of using the multi-access terminal to provide streaming audio/video (Internet radio and television) to mobile users.

The software of the present invention abstracts details of the load sharing implementation from application software, enabling conventional software to run unaffected, thereby reducing software complexity and hardware component count. If the software defined radio technology is used to implement the physical layer protocols for each desired network, eliminating the need for multiple network cards.

It will be understood that the embodiments described herein are merely exemplary and that a person skilled in the art may make many variations and modifications without departing from the spirit and scope of the invention. All such variations and modifications are intended to be included within the scope of the present invention as defined in the appended claims.

The invention claimed is:

1. A multi-access system adapted for allowing communication between a first system and a second system, said multi-access system comprising:

first means for receiving and transmitting data using a plurality of communications protocols;

second means for establishing a plurality of communications paths with the use of said first means, at least some of said communications paths forming an aggregated communications pipe over which the first system can communicate with the second system, said second means being configured to allow communication between the first system and the second system through the simultaneous use of at least two of said at least some of said communications paths;

an application awareness layer module for extracting traffic flow requirements from the first system; and a profile and policy manager module for storing theoretical and real-time application profiles, theoretical and real-time information about networks connected to said multi-access system, and mobility triggering events.

2. The system of claim 1, wherein said second means includes a decision engine for distributing traffic across said at least some of said communications paths.

3. The system of claim 2, wherein said decision engine aggregates and prioritizes said at least some of said communications paths, monitors communications performance across said at least some of said communications paths, adjusts traffic across said at least some of said communications paths in response to a mobility trigger event, performs multi-path routing of traffic across said at least some of said communications paths, and implements an optimal path graph for selecting an optimal communications path from said at least some of said communications paths.

4. The system of claim 2, wherein said second means includes a connection management module for establishing and maintaining said communications paths, and for establishing a new communications path through the use of said first means.

5. The system of claim 4, wherein said connection management module generates a trigger event in response to a status change in one of said at least some of said communications paths.

6. The system of claim 5, wherein said status change further includes an onset of congestion, a link failure, channel interference, and degradation in quality of service (QoS).

7. The system of claim 1, wherein said second means includes a virtual routing support subsystem for routing traffic flows across said at least some of said communications paths.

8. The system of claim 1, wherein said second means includes a multi-homing protocol for communicating across said at least some of said communications paths.

9. The system of claim 1, further comprising an analog radio for communicating voice information to a second analog radio at a remote location.

10. The system of claim 1, wherein said first means includes a plurality of wireless network transceivers, each of which is configured for receiving and transmitting data using one of said communications protocols.

11. The system of claim 10, wherein said plurality of wireless network transceivers includes a transceiver selected from the group consisting of an Ethernet transceiver, a Code Division Multiple Access (CDMA) transceiver, a Global System for Mobile Communications (GSM) transceiver, a 1XRTT transceiver, a General Packet Radio Service (GPRS) transceiver, a Universal Mobile Telecommunications System (UTMS) transceiver, a Worldwide Interoperability for Microwave Access (WiMAX) transceiver, a High-Speed Downlink Packet Access (HSPDA) transceiver, a satellite transceiver, an Integrated Digital Enhanced Network (iDEN) transceiver, and a cellular telephone transceiver.

12. The system of claim 1, wherein said first means includes a software defined radio.

13. The system of claim 1, wherein said second means includes an application flow detection and profiling module for detecting and profiling traffic flow requirements.

14. The system of claim 1, wherein the network capacity of each of said communications paths includes at least one of a bandwidth, a quality of service, a latency, a jitter and an error rate.

* * * * *